(12) United States Patent
Motoichi et al.

(10) Patent No.: US 11,165,261 B2
(45) Date of Patent: Nov. 2, 2021

(54) SECONDARY BATTERY PROTECTION CIRCUIT FOR CAUSING A DESIRED CURRENT TO FLOW IN EACH OF THE CELLS, SECONDARY BATTERY PROTECTION INTEGRATED CIRCUIT, AND BATTERY PACK

(71) Applicants: Yoshihiro Motoichi, Tokyo (JP); Iwao Kitamura, Tokyo (JP)

(72) Inventors: Yoshihiro Motoichi, Tokyo (JP); Iwao Kitamura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 83 days.

(21) Appl. No.: 16/016,836

(22) Filed: Jun. 25, 2018

(65) Prior Publication Data

US 2019/0020074 A1    Jan. 17, 2019

(30) Foreign Application Priority Data

Jul. 14, 2017   (JP) .............................. JP2017-138567

(51) Int. Cl.
*H02J 7/00* (2006.01)
*H01M 10/44* (2006.01)

(52) U.S. Cl.
CPC ......... *H02J 7/0013* (2013.01); *H01M 10/441* (2013.01); *H02J 7/00714* (2020.01);
(Continued)

(58) Field of Classification Search
CPC .... H01M 10/441; H02J 7/0013; H02J 7/0026; H02J 7/0083; H02J 7/0018; H02J 7/0019;
(Continued)

(56) References Cited

U.S. PATENT DOCUMENTS

| | | | |
|---|---|---|---|
| 2009/0278497 A1* | 11/2009 | Kim ...................... | H02J 7/0016 320/126 |
| 2011/0084667 A1* | 4/2011 | Li ......................... | H02J 7/0029 320/145 |

(Continued)

FOREIGN PATENT DOCUMENTS

| | | |
|---|---|---|
| EP | 1533881 | 9/2014 |
| JP | H11-075326 | 3/1999 |

(Continued)

OTHER PUBLICATIONS

Examination report for Indian Patent Application No. 201824025297 dated Mar. 20, 2020.

(Continued)

*Primary Examiner* — Richard Isla
*Assistant Examiner* — Manuel Hernandez
(74) *Attorney, Agent, or Firm* — IPUSA, PLLC

(57) ABSTRACT

A secondary battery protection circuit for protecting a secondary battery with multiple connected-in-parallel cells, includes a charging fault detection unit for each cell for prohibiting charging of the corresponding cell when overcharging and/or charging over-current for the corresponding cell is detected; a charging control element for each cell for cutting off a charging path for the corresponding cell when the charging of the corresponding cell is prohibited; a detection resistor for each cell inserted in series in the charging path; and a balance control unit for, in order to balance a first charging current flowing in a first charging path for a first cell with a second charging current flowing in a second charging path for a second cell, controlling a difference between the first and second charging currents in a saturation region of the charging control element based on a detection voltage generated by the detection resistor.

10 Claims, 12 Drawing Sheets

(52) U.S. Cl.
CPC ........... *H02J 7/0018* (2013.01); *H02J 7/0019* (2013.01); *H02J 7/0029* (2013.01); *H02J 7/00302* (2020.01); *H02J 7/00304* (2020.01)

(58) Field of Classification Search
CPC ............. H02J 7/0014; H02J 2007/0039; H02J 2007/0037; H02J 2007/004; H02J 7/00714; H02J 7/0029; H02J 7/00302; H02J 7/00304; H02J 7/00306
USPC .................................................. 320/125, 126
See application file for complete search history.

(56) References Cited

U.S. PATENT DOCUMENTS

| | | | |
|---|---|---|---|
| 2013/0063090 A1 | 3/2013 | Takeshita et al. | |
| 2014/0203763 A1* | 7/2014 | Zhao | H02J 7/0081 320/107 |
| 2014/0203780 A1* | 7/2014 | Hu | H02J 7/0014 320/112 |
| 2015/0180260 A1* | 6/2015 | Juan | H02J 7/0063 320/126 |
| 2016/0094065 A1* | 3/2016 | Motoichi | H02J 7/0021 320/126 |

FOREIGN PATENT DOCUMENTS

| | | |
|---|---|---|
| JP | 2013-059212 | 3/2013 |
| JP | 2015-050813 | 3/2015 |
| WO | 2009/106394 | 9/2009 |

OTHER PUBLICATIONS

Office Action dated Feb. 24, 2021 (Japanese Patent Application No. 2017-138567), With English Translation.

* cited by examiner

SECONDARY BATTERY PROTECTION CIRCUIT FOR CAUSING A DESIRED CURRENT TO FLOW IN EACH OF THE CELLS, SECONDARY BATTERY PROTECTION INTEGRATED CIRCUIT, AND BATTERY PACK

BACKGROUND OF THE INVENTION

1. Field of the Invention

The present invention relates to a secondary battery protection circuit, a secondary battery protection integrated circuit, and a battery pack.

2. Description of the Related Art

Conventionally, a technique is known for protecting a secondary battery including a plurality of cells that are connected in parallel.

CITATION LIST

Patent Document

[Patent Document 1] Japanese Unexamined Patent Application Publication No. 2013-059212

SUMMARY OF THE INVENTION

Technical Problem

However, in the conventional technique, an element controlling a current that flows in each of the cells is only controlled to be in either an ON state or an OFF state. Therefore, it is difficult to cause a desired current to flow in each of the cells.

Here, according to an embodiment of the present invention, a secondary battery protection circuit, a secondary battery protection IC (integrated circuit), and a battery pack, are provided in which it is possible to cause a desired current to flow in each of the cells.

Solution to Problem

An aspect of the present invention provides a secondary battery protection circuit for protecting a secondary battery that has a plurality of cells connected in parallel. The secondary battery protection circuit includes a charging fault detection unit configured to prohibit charging of the corresponding cell when at least one of overcharging and charging over-current for the corresponding cell is detected, the charging fault detection unit being provided for each of the cells; a charging control element configured to cut off a charging path of the corresponding cell in the case where the charging of the corresponding cell is prohibited by the charging fault detection unit, the charging control element being provided for each of the cells; a detection resistor that is inserted in series in the charging path, the detection resistor being provided for each of the cells; and a balance control unit configured to, in order to balance a first charging current that flows in a first charging path for a first cell with a second charging current that flows in a second charging path for a second cell, control a difference between the first charging current and the second charging current in a saturation region of the charging control element based on a detection voltage generated by the detection resistor.

Further, an aspect of the present invention provides a secondary battery protection circuit for protecting a secondary battery that has a plurality of cells connected in parallel. The secondary battery protection circuit includes a discharging fault detection unit configured to prohibit discharging of the corresponding cell when at least one of over-discharging and discharging over-current for the corresponding cell is detected, the discharging fault detection unit being provided for each of the cells; a discharging control element configured to cut off a discharging path of the corresponding cell in the case where the discharging of the corresponding cell is prohibited by the discharging fault detection unit, the discharging control element being provided for each of the cells; a detection resistor that is inserted in series in the discharging path, the detection resistor being provided for each of the cells; and a balance control unit configured to, in order to balance a first discharging current that flows in a first discharging path for a first cell with a second discharging current that flows in a second discharging path for a second cell, control a difference between the first discharging current and the second discharging current in a saturation region of the discharging control element based on a detection voltage generated by the detection resistor.

Further, an aspect of the present invention provides a secondary battery protection integrated circuit for protecting a secondary battery that has a plurality of cells connected in parallel. The secondary battery protection integrated circuit includes a charging fault detection unit configured to prohibit charging of the corresponding cell by operating a charging control element to cut off a charging path for the corresponding cell when at least one of overcharging and charging over-current for the corresponding cell is detected, the charging fault detection unit being provided for each of the cells; a balance control unit configured to, in order to balance a first charging current that flows in a first charging path for a first cell with a second charging current that flows in a second charging path for a second cell, control a difference between the first charging current and the second charging current in a saturation region of the charging control element based on a detection voltage generated by a detection resistor that is inserted in series in the charging path.

Further, an aspect of the present invention provides a secondary battery protection integrated circuit for protecting a secondary battery that has a plurality of cells connected in parallel. The secondary battery protection integrated circuit includes a discharging fault detection unit configured to prohibit discharging of the corresponding cell by operating a discharging control element to cut off a discharging path for the corresponding cell when at least one of over-discharging and discharging over-current for the corresponding cell is detected, the discharging fault detection unit being provided for each of the cells; a balance control unit configured to, in order to balance a first discharging current that flows in a first discharging path for a first cell with a second discharging current that flows in a second discharging path for a second cell, control a difference between the first discharging current and the second discharging current in a saturation region of the discharging control element based on a detection voltage generated by a detection resistor that is inserted in series in the discharging path.

Further, an aspect of the present invention provides a battery pack that includes the secondary battery protection circuit and the secondary battery.

Advantageous Effects of Invention

According to an embodiment of the present invention, it is possible to cause a desired current to flow in each of the cells.

DETAILED DESCRIPTION OF THE PREFERRED EMBODIMENTS

In the following, embodiments of the present invention will be described while making reference to the drawings.

Figure 1:
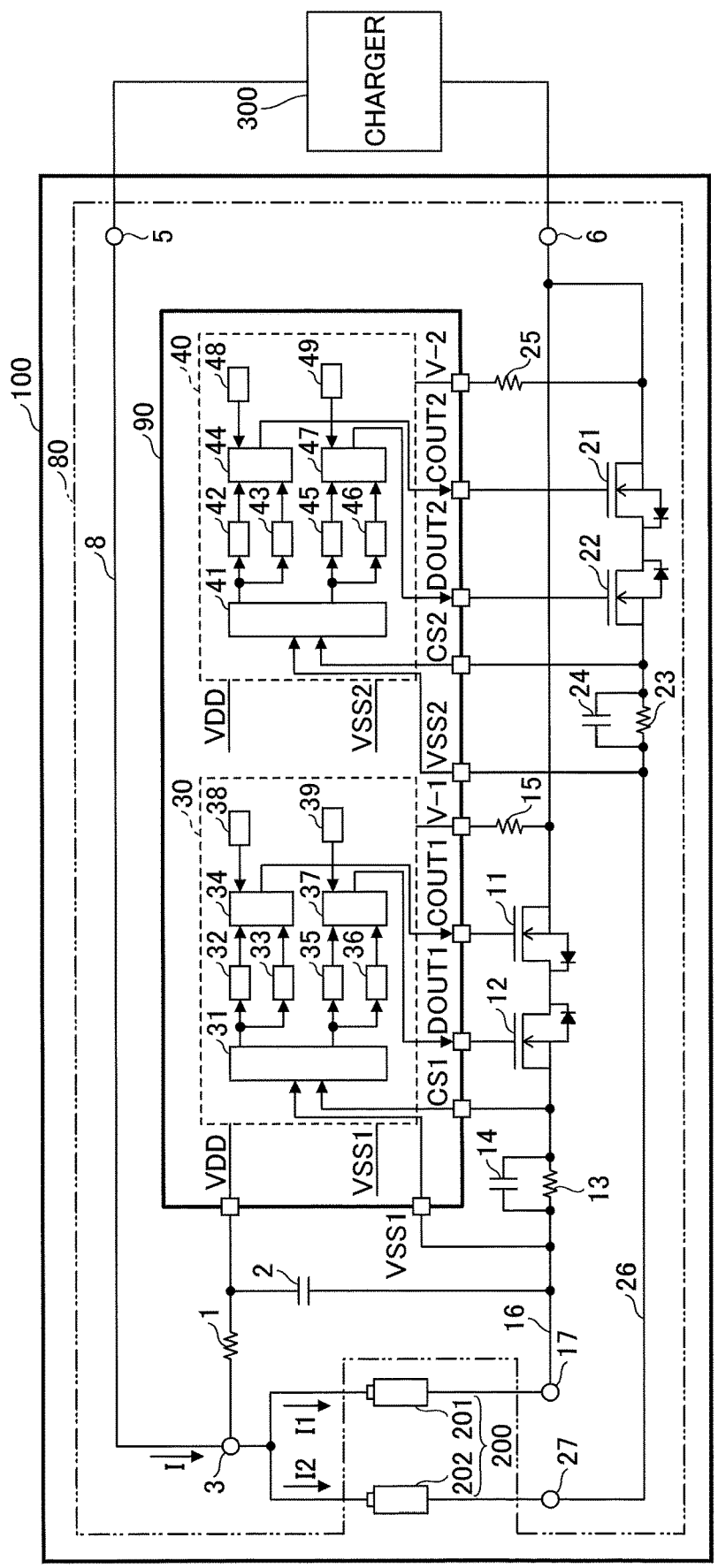
FIG. 1 is a drawing illustrating an example of a structure of a battery pack.

FIG. 1 is a diagram illustrating a battery pack 100 according to an embodiment of the present invention. The battery pack 100 includes a secondary battery 200 that is capable of supplying power to an external load (not shown) that is connected to load connection terminals 5 and 6; and a secondary battery protection circuit 80 that protects the secondary battery 200. The battery pack 100 may be included in the external load or may be externally attached to the external load. As a specific example of the external load, an electronic device may be listed including a mobile terminal (a mobile phone, a mobile game machine, a PDA, a mobile personal computer, a smart phone, a tablet terminal, an audio/video mobile player, or the like), a computer, a headset, a camera, etc.

The secondary battery 200 is enabled to be charged by a charger 300 that is connected to the load connection terminals 5 and 6. As a specific example of the secondary battery 200, a lithium ion battery, a nickel metal hydride battery, etc., may be listed. The secondary battery 200 includes two cells 201, 202 that are connected in parallel to each other.

The secondary battery protection circuit 80 includes a load connection terminal 5, a load connection terminal 6, and cell connection terminals 3, 17, 27, and is used as a battery protection device that protects the secondary battery 200 that are connected to the cell connection terminals 3, 17, 27 from over-current. The cell connection terminal 3 is connected to the load connection terminal 5 via a power supply path 8. The cell connection terminal 17 is connected to the load connection terminal 6 via a power supply path 16, and the cell connection terminal 27 is connected to the load connection terminal 6 via a power supply path 26. The cell connection terminal 3 is connected to positive electrodes of the cell 201 and the cell 202. The cell connection terminal 17 is not connected to a negative electrode of the cell 202, and is connected to a negative electrode of the cell 201. The cell connection terminal 27 is not connected to a negative electrode of the cell 201, and is connected to a negative electrode of the cell 202.

The secondary battery protection circuit 80 includes transistors 11, 12, 21, and 22. The transistor 11 is a charging path cut-off unit capable of cutting off a charging path for the cell 201, and the transistor 12 is a discharging path cut-off unit capable of cutting off a discharging path for the cell 201. The transistor 21 is a charging path cut-off unit capable of cutting off a charging path for the cell 202, and the transistor 22 is a discharging path cut-off unit capable of cutting off a discharging path for the cell 202. In a case illustrated in the figure, it is possible for the transistor 11 to cut off the power supply path 16 in which the charging current for the cell 201 flows, and it is possible for the transistor 12 to cut off the power supply path 16 in which the discharging current for the cell 301 flows. It is possible for the transistor 21 to cut off the power supply path 26 in which the charging current for the cell 202 flows, and it is possible for the transistor 22 to cut off the power supply path 26 in which the discharging current for the cell 202 flows.

The transistors 11 and 12 are switching elements each capable of switching the power supply path 16 between a conduction state and a cut-off (non-conduction) state, and are inserted in series in the power supply path 16. The transistors 21 and 22 are switching elements each capable of switching the power supply path 26 between a conduction state and a cut-off (non-conduction) state, and are inserted in series in the power supply path 26.

The transistors 11, 12, 21, and 22 are, for example, MOSFETs (Metal Oxide Semiconductor Field Effect Transistors). The transistor 11 is inserted in the power supply path 16 in such a way that a forward direction of a parasitic diode of the transistor 11 matches a discharging direction of the cell 201. The transistor 12 is inserted in the power supply path 16 in such a way that a forward direction of a parasitic diode of the transistor 12 matches a charging direction of the cell 201. The transistor 21 is inserted in the power supply path 26 in such a way that a forward direction of a parasitic diode of the transistor 21 matches a discharging direction of the cell 202. The transistor 22 is inserted in the power supply path 26 in such a way that a forward direction of a parasitic diode of the transistor 22 matches a charging direction of the cell 202.

It should be noted that the transistors 11, 12, 21, and 22 may be other semiconductor elements such as IGBTs (Insulated Gate Bipolar Transistors), bipolar transistors, etc. Further, a diode may be added to between the drain and the source (or between the collector and the emitter) of each of the transistors 11, 12, 21, and 22.

The secondary battery protection circuit 80 includes resistors 13, 23. The resistor 13 is a detection resistor for detecting a current value of a discharging current or a charging current that flows in the cell 201, and is inserted in series in the power supply path 16 between the cell connection terminal 17 and the transistors 11, 12. The resistor 23 is a detection resistor for detecting a current value of a discharging current or a charging current that flows in the cell 202, and is inserted in series in the power supply path 26 between the cell connection terminal 27 and the transistors 21, 22.

The secondary battery protection circuit 80 includes capacitors 14 and 24. The capacitor 14 is connected in parallel with the resistor 13. Precision (accuracy) of current detection using the resistor 13 is improved by connecting the capacitor 14 in parallel with the resistor 13. The capacitor 24 is connected in parallel with the resistor 23. Precision (accuracy) of current detection using the resistor 23 is improved by connecting the capacitor 24 in parallel with the resistor 23.

The secondary battery protection circuit 80 includes a protection IC 90. The protection IC 90 is a secondary battery protection integrated circuit, to which power is supplied by the secondary battery 200, that protects the secondary battery 200. The protection IC 90 consists of a single chip.

The protection IC 90 includes a VDD terminal, a VSS1 terminal, and a VSS2 terminal. The VDD terminal is a positive side power supply terminal that is connected to the cell connection terminal 3 or the power supply path 8 via a resistor 1. The VSS1 terminal is a negative side power supply terminal that is connected to the power supply path 16 between the cell connection terminal 17 and the resistor 13. The VSS2 terminal is a negative side power supply terminal that is connected to the power supply path 26 between the cell connection terminal 27 and the resistor 23.

The resistor 1 is a current limiting resistor that prevents over-current flowing to the VDD terminal. A capacitor 2 includes one end that is connected to between the resistor 1 and the other end that is connected to the power supply path 16 between the cell connection terminal 17 and the resistor 13. It is possible for an RC low-pass filter consisting of the resistor 1 and the capacitor 2 to smooth the power supply voltage between the VDD terminal and the VSS1 terminal.

The protect IC 90 includes a charging control circuit 34 that is enabled to turn on the transistor 11 by outputting a high-level signal from a COUT1 terminal of the protection IC 90, and that is enabled to turn off the transistor 11 by outputting a low-level signal. The charging control circuit 34 selectively outputs an output signal of a charging over-current detection circuit 32 or an output signal of the charging current control circuit 33.

Further, the protect IC 90 includes a discharging control circuit 37 that is enabled to turn on the transistor 12 by outputting a high-level signal from a DOUT1 terminal of the protection IC 90, and that is enabled to turn off the transistor 12 by outputting a low-level signal. The discharging control circuit 37 selectively outputs an output signal of a discharging over-current detection circuit 35 or an output signal of the discharging current control circuit 36.

Similarly, the protect IC 90 includes a charging control circuit 44 that is enabled to turn on the transistor 21 by outputting a high-level signal from a COUT2 terminal of the protection IC 90, and that is enabled to turn off the transistor 21 by outputting a low-level signal. The charging control circuit 44 selectively outputs an output signal of a charging over-current detection circuit 42 or an output signal of the charging current control circuit 43.

Further, the protect IC 90 includes a discharging control circuit 47 that is enabled to turn on the transistor 22 by outputting a high-level signal from a DOUT2 terminal of the protection IC 90, and that is enabled to turn off the transistor 22 by outputting a low-level signal. The discharging control circuit 47 selectively outputs an output signal of a discharging over-current detection circuit 45 or an output signal of the discharging current control circuit 46.

The secondary battery protection circuit 80 is an example of a secondary battery protection circuit for protecting a secondary battery that has a plurality of cells connected in parallel. The secondary battery protection circuit 80 includes a protection IC 90 including a protection control unit. The protection control unit is provided for each of a plurality of cells included in the second battery, and controls protection of the corresponding cell. A protection control circuit 30 is provided for the cell 201, and is an example of the protection control unit that controls protection of the cell 201. A protection control circuit 40 is provided for the cell 202, and is an example of the protection control unit that controls protection of the cell 202.

The protection control circuit 30 includes a current detection circuit 31, a charging over-current detection circuit 32, a charging current control circuit 33, a charging control circuit 34, a discharging over-current detection circuit 35, a discharging current control circuit 36, a discharging control circuit 37, an over charging detection circuit 38, and an over discharging detection circuit 39. The protection control circuit 40 includes a current detection circuit 41, a charging over-current detection circuit 42, a charging current control circuit 43, a charging control circuit 44, a discharging over-current detection circuit 45, a discharging current control circuit 46, a discharging control circuit 47, an over-charging detection circuit 48, and an over-discharging detection circuit 49.

The secondary battery protection circuit 80 includes a protection IC 90 that includes a charging current control unit provided for each of the plurality of the cells included in the secondary battery, and that includes a discharging current control unit provided for each of the plurality of the cells included in the secondary battery.

A charging current control circuit 33 is an example of the charging current control unit provided for the cell 201, and a discharging current control circuit 36 is an example of the discharging current control unit provided for the cell 201. The charging current control circuit 33 and the discharging current control circuit 36 operate by having, as a power supply voltage, a voltage between the VDD terminal and the VSS1 terminal or a CS1 terminal. Similarly, the charging current control circuit 43 is an example of the charging current control unit provided for the cell 202, and the discharging current control circuit 46 is an example of the discharging current control unit provided for the cell 202. The charging current control circuit 43 and the discharging current control circuit 46 operate by having, as a power supply voltage, a voltage between the VDD terminal and the VSS2 terminal or a CS2 terminal.

Further, the secondary battery protection circuit 80 includes a charging control element that is provided in a charging path for each of the plurality of the cells included in the secondary battery, and a discharging control element that is provided in a discharging path for each of the plurality of the cells included in the secondary battery.

The transistor 11 is an example of a charging control element provided in the power supply path 16 as a charging path for the cell 201. The transistor 12 is an example of a discharging control element provided in the power supply path 16 as a discharging path for the cell 201. Similarly, the transistor 21 is an example of a charging control element provided in the power supply path 26 as a charging path for the cell 202. The transistor 22 is an example of a discharging control element provided in the power supply path 26 as a discharging path for the cell 202.

The charging over-current detection circuit 32 turns on the corresponding transistor 11 (operates in a non-saturation region) in the case where a predetermined charging over-current detection threshold value is not exceeded. The charging over-current detection circuit 32 outputs a charging over-current detection signal to turn off the corresponding transistor 11 (operates in a cutting-off region) in the case where a predetermined charging over-current detection threshold value is exceeded. The charging over-current detection circuit 42 operates in the same way for operating the corresponding transistor 21.

The discharging over-current detection circuit 35 turns on the corresponding transistor 12 (operates in a non-saturation region) in the case where a predetermined discharging over-current detection threshold value is not exceeded. The discharging over-current detection circuit 35 outputs a discharging over-current detection signal to turn off the corresponding transistor 12 (operates in a cutting-off region) in the case where the predetermined discharging over-current detection threshold value is exceeded. The discharging over-current detection circuit 45 operates in the same way for operating the corresponding transistor 22.

The charging current control circuit 33 performs charging current control in which, during a charging period in which a charging current I1 is flowing in the cell 201 that corresponds to the charging current control circuit 33, the transistor 11 is controlled in a saturation region so that the charging current I1 is maintained at a charging current value Icth1. The transistor 11 is a charging current control element that operates in a saturation region according to the charging current control of the charging current control circuit 33 so that the charging current I1 is maintained at the charging current value Icth1 during the charging period in which the charging current I1 is flowing. The transistor 11 is capable of maintaining the charging current I1 that flows in a charging direction for the cell 201 at the charging current value Icth1, and the charging current control circuit 33 causes the transistor 11 to operate in a saturation region so that the charging current I1 is maintained at the charging current value Icth1.

Therefore, the charging current control circuit 33 is capable of causing the charging current I1 to continue to flow at a current value greater than zero by controlling the flow of the charging current I1 in such a way that the charging current I1 is maintained at the charging current value Icth1 even if the charging current I1 deviates from the charging current value Icth1.

Similarly, the charging current control circuit 43 performs charging current control in which, during a charging period in which a charging current I2 is flowing in the cell 202 that corresponds to the charging current control circuit 43, the transistor 21 is controlled in a saturation region so that the charging current I2 is maintained at a charging current value Icth2. The transistor 21 is a charging current control element that operates in a saturation region according to the charging current control of the charging current control circuit 43 so that the charging current I2 is maintained at the charging current value Icth2 during the charging period in which the charging current I2 is flowing. The transistor 21 is capable of maintaining the charging current I2, that flows in a charging direction for the cell 202, at the charging current value Icth2, and the charging current control circuit 43 causes the transistor 21 to operate in a saturation region so that the charging current I2 is maintained at the charging current value Icth2.

Therefore, the charging current control circuit 43 is capable of causing the charging current I2 to continue to flow at a current value greater than zero by controlling the flow of the charging current I2 in such a way that the charging current I2 is maintained at the charging current value Icth2 even if the charging current I2 deviates from the charging current value Icth2.

It should be noted that a charging current I that flows in the power supply path 8 is a sum of the charging current I1 that flows in the cell 201 and the power supply path 16, and the charging current I2 that flows in the cell 202 and the power supply path 26. Further, the charging current value Icth1 and the charging current value Icth2 may be the same value, or may be different values.

As described above, it is possible to prevent an excessive charging/discharging current from flowing between the cells by maintaining the charging current I1 or I2 at a predetermined charging current value even if capacities of the cell 201 and the cell 202 are different from each other. Further, as it is possible to connect in parallel a plurality of cells having capacities different from each other, it is possible to use a limited mounting area efficiently. For example, the volume of a cell decreases as the capacity decreases. Therefore, when mounting a plurality of cells on a substrate, it is possible to mount a cell that has relatively smaller capacity in a gap space (created between the cells) that exists on the substrate.

Further, as described above, it is possible to prevent an excessive charging/discharging current from flowing between the cells by maintaining the charging current I1 or I2 at a predetermined charging current value even if a voltage difference between the cells is great at the time of connection of the cell 201 and the cell 202. Further, by maintaining the charging current I1 or I2 at a predetermined charging current value, it is possible to prevent an excessive charging current from flowing into other cells even when some cell is fully charged. Further, by maintaining the charging current I1 or I2 at a predetermined charging current value, it is possible to prevent an excessive charging current from flowing into other cells even if an internal impedance of some cell is increased due to the cell deterioration, or the like.

It should be noted that the charging current control circuit 33 is enabled to adjust a voltage value between the gate and the source of the transistor 11 in an analog manner by controlling a voltage value between the COUT1 terminal and a V-1 terminal in the protection IC 90 in an analog manner. Therefore, the charging current control circuit 33 is enabled to perform the adjustment by increasing/decreasing the current value of the charging current I1. The COUT1 terminal is connected to the gate of the transistor 11, and the V-1 terminal is connected to the source of the transistor 11 via a resistor 15. Similarly, the charging current control circuit 43 is enabled to adjust a voltage value between the gate and the source of the transistor 21 in an analog manner by controlling a voltage value between the COUT2 terminal and a V-2 terminal in the protection IC 90 in an analog manner. Therefore, the charging current control circuit 43 is enabled to perform the adjustment by increasing/decreasing the current value of the charging current I2. The COUT2 terminal is connected to the gate of the transistor 21, and the V-2 terminal is connected to the source of the transistor 21 via a resistor 25.

With respect to the above, the discharging current control circuit 36 performs discharging current control in which, during a discharging period in which a discharging current I1 is flowing in the cell 201 that corresponds to the discharging current control circuit 36, the transistor 12 is controlled in a saturation region so that the discharging current I1 is maintained at a predetermined discharging current value Idth1. Here, the discharging current I1 indicates a current whose direction is opposite to an arrow illustrated in the figure. The transistor 12 is a discharging current control element that operates in a saturation region according to the discharging current control of the discharging current control circuit 36 so that the discharging current I1 is maintained at a discharging current value Idth1 during the discharging period in which the discharging current I1 is flowing. The transistor 12 is capable of maintaining the discharging current I1, that flows in a discharging direction for the cell 201, at the discharging current value Idth1, and the discharging current control circuit 36 causes the transistor 12 to operate in a saturation region so that the discharging current I1 is maintained at the discharging current value Idth1.

Therefore, the discharging current control circuit 36 is capable of causing the discharging current I1 to continue to flow at a current value greater than zero by controlling the flow of the discharging current I1 in such a way that the discharging current I1 is maintained at the discharging current value Idth1 even if the discharging current I1 deviates from the discharging current value Idth1.

Similarly, the discharging current control circuit 46 performs discharging current control in which, during a discharging period in which a discharging current I2 is flowing in the cell 202 that corresponds to the discharging current control circuit 46, the transistor 22 is controlled in a saturation region so that the discharging current I2 is maintained at a predetermined discharging current value Idth2. Here, the discharging current I2 indicates a current whose direction is opposite to an arrow illustrated in the figure. The transistor 22 is a discharging current control element that operates in a saturation region according to the discharging current control of the discharging current control circuit 46 so that the discharging current I2 is maintained at a discharging current value Idth2 during the discharging period in which the discharging current I2 is flowing. The transistor 22 is capable of maintaining the discharging current I2, that flows in a discharging direction for the cell 202, at the discharging current value Idth2, and the discharging current control circuit 46 causes the transistor 22 to operate in a saturation region so that the discharging current I2 is maintained at the discharging current value Idth2.

Therefore, the discharging current control circuit 46 is capable of causing the discharging current I2 to continue to flow at a current value greater than zero by controlling the flow of the discharging current I2 in such a way that the discharging current I2 is maintained at the discharging current value Idth2 even if the discharging current I2 deviates from the discharging current value Idth2.

It should be noted that a discharging current I that flows in the power supply path 8 (a current whose direction is opposite to an arrow illustrated in the figure) is a sum of the discharging current I1 that flows in the cell 201 and the power supply path 16, and the discharging current I2 that flows in the cell 202 and the power supply path 26. Further, the discharging current value Idth1 and the discharging current value Idth2 may be the same value, or may be different values.

In this way, it is possible to prevent an excessive charging/discharging current from flowing between the cells by maintaining the discharging current I1 or I2 at a predetermined discharging current value even if capacities of the cell 201 and the cell 202 are different from each other. Further, as it is possible to connect in parallel a plurality of cells with capacities different from each other, it is possible to use a limited mounting area efficiently. For example, the volume of a cell decreases as the capacity decreases. Therefore, when mounting a plurality of cells on a substrate, it is possible to mount a cell that has relatively smaller capacity in a gap space (created between the cells) that exists on the substrate.

Further, as described above, it is possible to prevent an excessive charging/discharging current from flowing between the cells by maintaining the discharging current I1 or I2 at a predetermined discharging current value even if a voltage difference is great between the cells at the time of connection of the cell 201 and the cell 202. In particular, it is possible to further quickly prevent an excessive charging/discharging current from flowing between the cells by combining with the above-described function for maintaining the charging current I1 or I2 at a predetermined charging current value.

Further, it is possible to prevent an excessive load current from flowing into a load that is connected to the load connection terminal 5 via the power supply path 8 by maintaining the discharging current I1 or I2 at a predetermined discharging current value.

It should be noted that the discharging current control circuit 36 is enabled to adjust a voltage value between the gate and the source of the transistor 12 in an analog manner by controlling a voltage value between the DOUT1 terminal and the VSS1 terminal or the CS1 terminal in the protection IC 90 in an analog manner. Therefore, the discharging current control circuit 36 is enabled to perform the adjustment by increasing/decreasing the current value of the discharging current I1. The DOUT1 terminal is connected to the gate of the transistor 12, the VSS1 terminal is connected to the source of the transistor 12 via the resistor 13, and the CS1 terminal is connected to the source of the transistor 12 without passing through the resistor 13. Similarly, the discharging current control circuit 46 is enabled to adjust a voltage value between the gate and the source of the transistor 22 in an analog manner by controlling a voltage value between the DOUT2 terminal and the VSS2 terminal or the CS2 terminal in the protection IC 90 in an analog manner. Therefore, the discharging current control circuit 46 is enabled to perform the adjustment by increasing/decreasing the current value of the discharging current I2. The DOUT2 terminal is connected to the gate of the transistor 22, the VSS2 terminal is connected to the source of the transistor 22 via the resistor 23, and the CS2 terminal is connected to the source of the transistor 22 without passing through the resistor 23.

It is possible to obtain a detection value of the charging current I1 or a detection value of the discharging current I1 by detecting a voltage between the VSS1 terminal and the CS1 terminal in the protection IC 90 by the current detection circuit 31 of the protection IC 90. The current detection circuit 31 is enabled to obtain a detection value of the charging current I1 or the discharging current I1 by measuring, for example, a voltage between the two ends of the resistor 13 and a direction of the current that flows in the resistor 13. The VSS1 terminal is connected to the power supply path 16 between the cell connection terminal 17 and one end of the resistor 13, and the CS1 terminal is connected to the power supply path 16 between the other end of the resistor 13 and the transistors 11, 12.

Similarly, it is possible to obtain a detection value of the charging current I2 or a detection value of the discharging current I2 by detecting a voltage between the VSS2 terminal and the CS2 terminal in the protection IC 90 by the current detection circuit 41 of the protection IC 90. The current detection circuit 41 is enabled to obtain a detection value of the charging current I2 or the discharging current I2 by measuring, for example, a voltage between the two ends of the resistor 23 and direction of the current that flows in the resistor 23. The VSS2 terminal is connected to the power supply path 26 between the cell connection terminal 27 and one end of the resistor 23, and the CS2 terminal is connected to the power supply path 26 between the other end of the resistor 23 and the transistors 21, 22.

The current detection circuit 31 is an example of a current detection unit provided for the cell 201. The current detection circuit 31 operates by having, as a power supply voltage, a voltage between the VDD terminal and the VSS1 terminal or the CS1 terminal. Similarly, the current detection circuit 41 is an example of a current detection unit provided for the cell 202. The current detection circuit 41 operates by having, as a power supply voltage, a voltage between the VDD terminal and the VSS2 terminal or the CS2 terminal.

The secondary battery protection circuit 80 includes a protection IC 90 including a charging over-current detection unit provided for each of the plurality of cells included in the secondary battery. A charging over-current detection circuit 32 is an example of the charging over-current detection unit provided for the cell 201, and a charging over-current detection circuit 42 is an example of the charging over-current detection unit provided for the cell 202.

The charging over-current detection circuit 32 determines that an over-current in a charging direction for the cell 201 (charging over-current) is detected in the case where a detection value of the charging current I1 that is equal to or greater than a predetermined first charging over-current detection threshold value is obtained from the current detection circuit 31. The charging over-current detection circuit 32 prohibits the charging current from flowing into the cell 201 in the case where a charging over-current of the cell 201 is detected. The charging over-current detection circuit 32 outputs a charging prohibition signal (charging over-current detection signal) in the case of prohibiting the charging current I1 from flowing into the cell 201.

The charging over-current detection circuit 42 is a circuit similar to the charging over-current detection circuit 32. The charging over-current detection circuit 42 outputs a charging prohibition signal (charging over-current detection signal) for prohibiting the charging current I2 from flowing into the cell 202 in the case where a detection value of the charging current I2 that is equal to or greater than a predetermined second charging over-current detection threshold value is obtained from the current detection circuit 41.

It should be noted that the first charging over-current detection threshold value and the second charging over-current detection threshold value may be the same value or may be different values.

The secondary battery protection circuit 80 includes a protection IC 90 including a discharging over-current detection unit provided for each of the plurality of cells included in the secondary battery. A discharging over-current detection circuit 35 is an example of the discharging over-current detection unit provided for the cell 201, and a discharging over-current detection circuit 45 is an example of the discharging over-current detection unit provided for the cell 202.

The discharging over-current detection circuit 35 determines that an over-current in a discharging direction for the cell 201 (discharging over-current) is detected in the case where a detection value of the discharging current I1 that is equal to or greater than a predetermined first discharging over-current detection threshold value is obtained from the current detection circuit 31. The discharging over-current detection circuit 35 prohibits the discharging current I1 from flowing out of the cell 201 in the case where a discharging over-current of the cell 201 is detected. The discharging over-current detection circuit 35 outputs a discharging prohibition signal (discharging over-current detection signal) in the case of prohibiting the discharging current I1 from flowing out of the cell 201.

The discharging over-current detection circuit 45 is a circuit similar to the discharging over-current detection circuit 35. The discharging over-current detection circuit 45 outputs a discharging prohibition signal (discharging over-current detection signal) for prohibiting the discharging current I2 from flowing out of the cell 202 in the case where a detection value of the discharging current I2 that is equal to or greater than a predetermined second discharging over-current detection threshold value is obtained from the current detection circuit 41.

It should be noted that the first discharging over-current detection threshold value and the second discharging over-current detection threshold value may be the same value or may be different values.

The secondary battery protection circuit 80 includes a protection IC 90 including an overcharge detection unit provided for each of the plurality of cells included in the secondary battery. An overcharge detection circuit 38 is an example of an overcharge detection unit provided for the cell 201, and an overcharge detection circuit 48 is an example of the overcharge detection unit provided for the cell 202.

The overcharge detection circuit 38 is a charging over-voltage detection circuit that determines that an overcharge is detected for the cell 201 by detecting a cell voltage that is equal to or greater than a predetermined first overcharge detection threshold value for the cell 201. The overcharge detection circuit 38 prohibits charging of the cell 201 in the case where an overcharge is detected for the cell 201. The overcharge detection circuit 38 outputs a charging prohibition signal (overcharging detection signal) in the case of prohibiting the charging of the cell 201.

The overcharge detection circuit 48 is a circuit similar to the overcharge detection circuit 38. The overcharge detection circuit 48 prohibits charging of the cell 202 and outputs a charging prohibition signal (overcharging detection signal) in the case where a cell voltage that is equal to or greater than a predetermined second overcharge detection threshold value is detected for the cell 202.

It should be noted that the first overcharge detection threshold value and the second overcharge detection threshold value may be the same value or may be different values.

The secondary battery protection circuit 80 includes a protection IC 90 including an over-discharge detection unit provided for each of the plurality of cells included in the secondary battery. An over-discharge detection circuit 39 is an example of an over-discharge detection unit provided for the cell 201, and an over-discharge detection circuit 49 is an example of an over-discharge detection unit provided for the cell 202.

The over-discharge detection circuit 39 is a discharging over-voltage detection circuit that determines that an over-discharge is detected for the cell 201 by detecting a cell voltage that is equal to or less than a predetermined first over-discharge detection threshold value for the cell 201. The over-discharge detection circuit 39 prohibits discharging of the cell 201 in the case where an over-discharge is detected for the cell 201. The over-discharging detection circuit 39 outputs a discharging prohibition signal (over-discharging detection signal) in the case of prohibiting the discharging of the cell 201.

The over-discharging detection circuit 49 is a circuit similar to the over-discharging detection circuit 39. The over-discharging detection circuit 49 outputs a discharging prohibition signal (over-discharging detection signal) for prohibiting discharging of the cell 202 in the case where a cell voltage that is equal to or greater than a predetermined second over-discharging detection threshold value is detected for the cell 202.

It should be noted that the first over-discharging detection threshold value and the second over-discharging detection threshold value may be the same value or may be different values.

The charging control circuit 34 turns off the transistor 11 when a charging prohibition signal is output from at least one of the detection circuits, the overcharging detection circuit 38 and the charging over-current detection circuit 32. By turning off the transistor 11, it is possible to cut off the power supply path 16 in which the charging current for the cell 201 flows, and thus, it is possible to stop the charging current flowing into the cell 201 and protect the cell 201 from overcharging or charging over-current. The overcharging detection circuit 38 and the charging over-current detection circuit 32 are examples of a charging fault detection unit that prohibits charging of the cell 201. Similarly, the charging control circuit 44 turns off the transistor 21 when a charging prohibition signal is output from at least one of the detection circuits, the overcharging detection circuit 48 and the charging over-current detection circuit 42. By turning off the transistor 21, it is possible to cut off the power supply path 26 in which the charging current for the cell 202 flows, and thus, it is possible to stop the charging current flowing into the cell 202 and protect the cell 202 from overcharging or charging over-current. The overcharging detection circuit 48 and the charging over-current detection circuit 42 are examples of a charging fault detection unit that prohibits charging of the cell 202.

The charging control circuit 37 turns off the transistor 12 when a discharging prohibition signal is output from at least one of the detection circuits, the over-discharging detection circuit 39 and the discharging over-current detection circuit 35. By turning off the transistor 12, it is possible to cut off the power supply path 16 in which the discharging current for the cell 201 flows, and thus, it is possible to stop the discharging current flowing out of the cell 201 and protect the cell 201 from over-discharging or discharging over-current. The over-discharging detection circuit 39 and the discharging over-current detection circuit 35 are examples of a discharging fault detection unit that prohibits discharging of the cell 201. Similarly, the discharging control circuit 47 turns off the transistor 22 when a discharging prohibition signal is output from at least one of the detection circuits, the over-discharging detection circuit 49 and the discharging over-current detection circuit 45. By turning off the transistor 22, it is possible to cut off the power supply path 26 in which the discharging current for the cell 202 flows, and thus, it is possible to stop the discharging current flowing out of the cell 202 and protect the cell 202 from over-discharging or discharging over-current. The over-discharging detection circuit 49 and the discharging over-current detection circuit 45 are examples of a discharging fault detection unit that prohibits discharging of the cell 202.

According to a potential difference $\Delta V$ between the same electrodes of the cell 201 and the cell 202, and/or according to the currents I1, I2, the charging control circuit 34 switches between performing charging current control by using the charging current control circuit 33 and stopping the current by using the charging over-current detection circuit 32. "Between the same electrodes of the cell 201 and the cell 202" indicates "between the negative electrode of the cell 201 and the negative electrode of the cell 202" in the figure. The charge control circuit 34 prohibits the charging current control circuit 33 from performing the charging current control, and permits the charging over-current detection circuit 32 to stop flowing of the charging current I1 in the case where, for example, the potential difference $\Delta V$, assuming that the charging direction is a positive direction, is less than a setting threshold value Vth that is equal to or greater than zero. Conversely, the charging control circuit 34 permits the charging current control circuit 33 to perform the charging current control, and prohibits the charging over-current detection circuit 32 from stopping the flowing of the charging current I1 in the case where, for example, the potential difference $\Delta V$, assuming that the charging direction is a positive direction, is equal to or greater than the setting threshold value Vth.

It is possible for the charging control circuit 34 to determine whether an excessive charging/discharging current flows between the cell 201 and the cell 202 by determining whether or not the potential difference $\Delta V$ is equal to or greater than the setting threshold value Vth. A state, in which the potential difference $\Delta V$ is equal to or greater than the setting threshold value Vth assuming that the charging direction is a positive direction, is a state in which an excessive charging/discharging current flows between the cell 201 and the cell 202. In such a state, even if a charging over-current is detected by the charging over-current detection circuit 32, it is still possible to cause the charging current I1 to flow at a current value that is greater than zero by allowing the charging current to be controlled by the charging current control circuit 33. Conversely, a state, in which the potential difference $\Delta V$ is less than the setting threshold value Vth assuming that the charging direction is a positive direction, is a state in which no excessive charging/discharging current flows between the cell 201 and the cell 202. In such a state, if the charging over-current is detected by the charging over current detection circuit 32, it is possible to stop the flowing of the charging current I1.

According to a potential difference $\Delta V$ and/or according to the currents I1, I2, the charging control circuit 44 also switches between performing charging current control by using the charging current control circuit 43 and stopping the current by using the charging over-current detection circuit 42. The charging control circuit 44 may be the same circuit as the charging control circuit 34, and thus, the detailed descriptions will be omitted. Similar to the charging control circuit 34, the charging control circuit 44 can provide the similar effects with respect to the charging current I2.

According to a potential difference ΔV and/or according to the currents I1, I2, the discharging control circuit 37 switches between performing discharging current control by using the discharging current control circuit 36 and stopping the current by using the discharging over-current detection circuit 35. The discharging control circuit 37 prohibits the discharging current control circuit 36 from performing the discharging current control, and permits the discharging over-current detection circuit 35 to stop flowing of the discharging current I1 in the case where, for example, the potential difference ΔV, assuming that the discharging direction is a positive direction, is less than a setting threshold value Vth that is equal to or greater than zero. Conversely, the discharging control circuit 37 permits the discharging current control circuit 36 to perform the discharging current control, and prohibits the discharging over-current detection circuit 35 from stopping the flowing of the discharging current I1 in the case where, for example, the potential difference ΔV, assuming that the discharging direction is a positive direction, is equal to or greater than the setting threshold value Vth.

It is possible for the discharging control circuit 37 to determine whether an excessive charging/discharging current flows between the cell 201 and the cell 202 by determining whether or not the potential difference ΔV is equal to or greater than the setting threshold value Vth. A state, in which the potential difference ΔV is equal to or greater than the setting threshold value Vth assuming that the discharging direction is a positive direction, is a state in which an excessive charging/discharging current flows between the cell 201 and the cell 202. In such a state, even if discharging over-current is detected by the discharging over-current detection circuit 35, it is still possible to cause the discharging current I1 to flow at a current value that is greater than zero by allowing the discharging current to be controlled by the discharging current control circuit 36. Conversely, a state, in which the potential difference ΔV is less than the setting threshold value Vth assuming that the discharging direction is a positive direction, is a state in which no excessive charging/discharging current flows between the cell 201 and the cell 202. In such a state, if the discharging over-current is detected by the discharging over current detection circuit 35, it is possible to stop the flowing of the discharging current I1.

According to a potential difference ΔV and/or according to the currents I1, I2, the discharging control circuit 47 also switches between performing discharging current control by using the discharging current control circuit 46 and stopping the current by using the discharging over-current detection circuit 45. The discharging control circuit 47 may also be the same circuit as the discharging control circuit 37, and thus, the detailed descriptions will be omitted. Similar to the discharging control circuit 37, the discharging control circuit 44 can provide the similar effects with respect to the discharging current I2.

It should be noted that the potential difference ΔV can be obtained by detecting a voltage between the VSS1 terminal and the VSS2 terminal (or, a voltage between the cell connection terminal 17 and the cell connection terminal 27). Further, the current I1 can be obtained by detecting a voltage between the two ends of the resistor 13, and the current I2 can be obtained by detecting a voltage between the two ends of the resistor 23.

Figure 2:
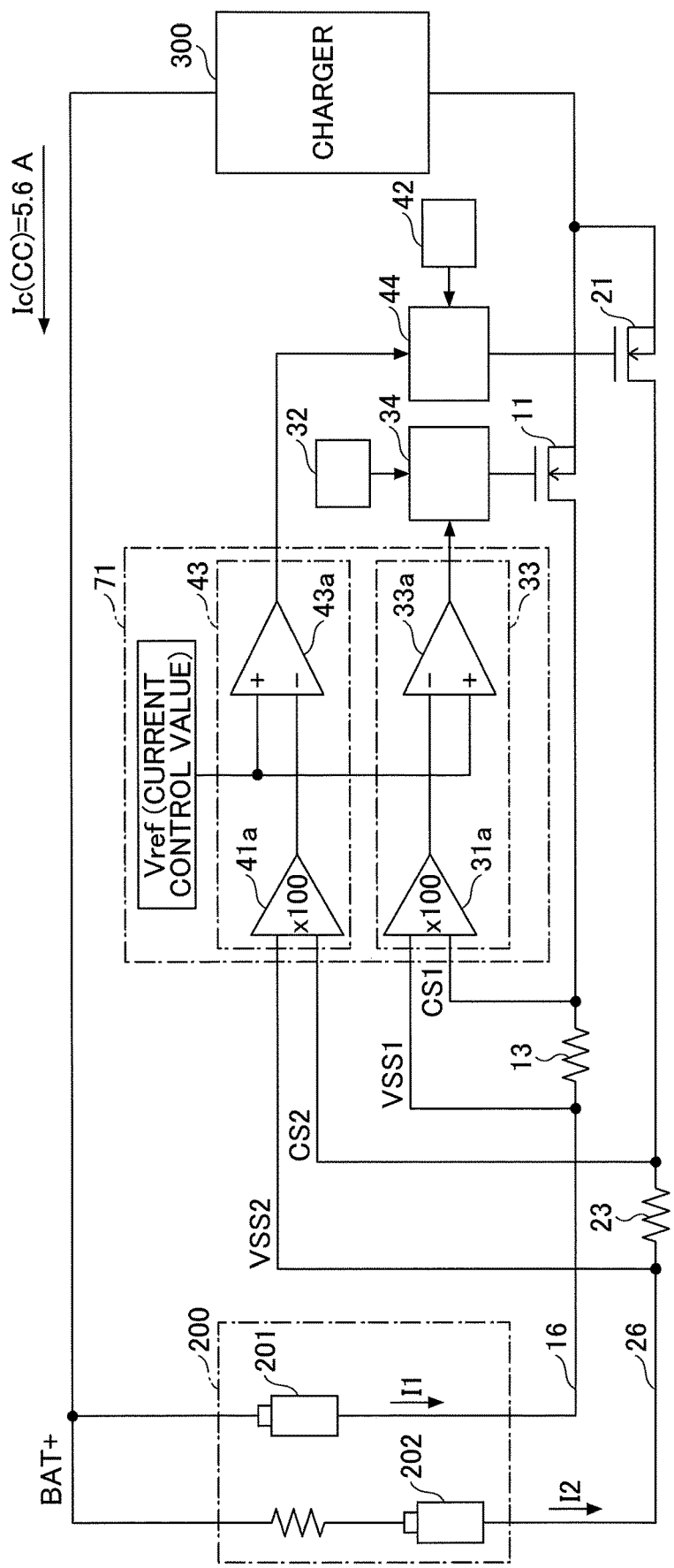
FIG. 2 is a drawing illustrating an example of a structure of a balance control unit according to a first embodiment of the present invention when balancing charging currents that flow in charging paths.

FIG. 2 is a drawing illustrating an example of a structure of a balance control unit according to a first embodiment of the present invention when balancing the charging currents that flow in the charging paths. The protection IC 90 according to the first embodiment includes a balance control unit 71. In order to balance the charging current I1 and the charging current I2, based on a detection voltage generated by each of the resistors 13 and 23, the balance control unit 71 controls a difference between the charging current I1 and the charging current I2 in a saturation region of each of the transistors 11 and 21. The secondary battery 200 is charged by a constant charging current Ic (CC) (e.g., 5.6 A) supplied from a charger 300.

The balance control unit 71 operates each of the transistors 11 and 21 in a non-saturation region in a state in which the charging current I1 and the charging current I2 are balanced. The balance control unit 71 operates each of the transistors 11 and 21 in a saturation region in a state in which the charging current I1 and the charging current I2 are not balanced (a state in which there is a current difference between the charging current I1 and the charging current I2).

For example, the balance control unit 71 includes the above-described charging current control circuit 33 provided for the cell 201 and the above-described charging current control circuit 43 provided for the cell 202.

The charging current control circuit 33 controls the difference between the charging current I1 and the charging current I2 in a saturation region of the transistor 11 by amplifying a detection voltage generated by the charge current I1 flowing in the resistor 13 by using an amplifier 31a, and by applying a negative feedback based on a reference voltage Vref. The charging current control circuit 33 includes, for example, the amplifier 31a and an operational amplifier 33a. For example, in the case where the amplification factor of the amplifier 31a is 100 times, the amplifier 31a outputs a detection voltage that is 100 times the voltage between the two ends of the resistor 13.

The detection voltage that has been amplified by the amplifier 31a is input to an inverting input node of the operational amplifier 33a, and the reference voltage Vref is input to a non-inverting input node of the operational amplifier 33a. An output voltage of the operational amplifier 33a is a first analog adjustment signal used for adjusting a control voltage value that is input to the transistor 11, and is supplied to the charging control circuit 34. The charging control circuit 34 operates the transistor 11 in a saturation region according to the first analog adjustment signal that is supplied from the charging current control circuit 33.

Similarly, the charging current control circuit 43 controls the difference between the charging current I1 and the charging current I2 in a saturation region of the transistor 21 by amplifying a detection voltage generated by the charging current I2 flowing in the resistor 23 by using an amplifier 41a, and by applying a negative feedback based on the reference voltage Vref. The charging current control circuit 43 includes, for example, an amplifier 41a and an operational amplifier 43a. For example, in the case where an amplification factor of the amplifier 41a is 100 times, the amplifier 41a outputs a detection voltage that is 100 times the voltage between the two ends of the resistor 23.

The detection voltage that has been amplified by the amplifier 41a is input to an inverting input node of the operational amplifier 43a, and the reference voltage Vref is input to a non-inverting input node of the operational amplifier 43a. An output voltage of the operational amplifier 43a is a second analog adjustment signal used for adjusting a control voltage value that is input to the transistor 21, and is supplied to the charging control circuit 44. The charging control circuit 44 operates the transistor 21 in a saturation region according to the second analog adjustment signal that is supplied from the charging current control circuit 43.

The reference voltage Vref is an example of a predetermined voltage. The reference voltage Vref is a voltage that is set to the same voltage value in each of the charging current control circuits 33 and 43, and that corresponds to the charging current values Icth1 and Icth2 (current control value)

In this way, by amplifying a voltage generated at the resistor 13 by the amplifier 31a, and by applying a negative feedback by using the operational amplifier 33a and the transistor 11, the gate voltage of the transistor 11 is adjusted in such a way that an output voltage of the amplifier 31a matches the reference voltage Vref. In other words, it is possible to set the charging current I1 at a desired current value (current control value corresponding to the reference voltage Vref) according to the reference voltage Vref. Similarly, by amplifying a voltage generated at the resistor 23 by the amplifier 41a, and by applying a negative feedback by using the operational amplifier 43a and the transistor 21, the gate voltage of the transistor 21 is adjusted in such a way that an output voltage of the amplifier 41a matches the reference voltage Vref. In other words, it is possible to set the charging current I2 at a desired current value (current control value corresponding to the reference voltage Vref) according to the reference voltage Vref.

Figure 3:
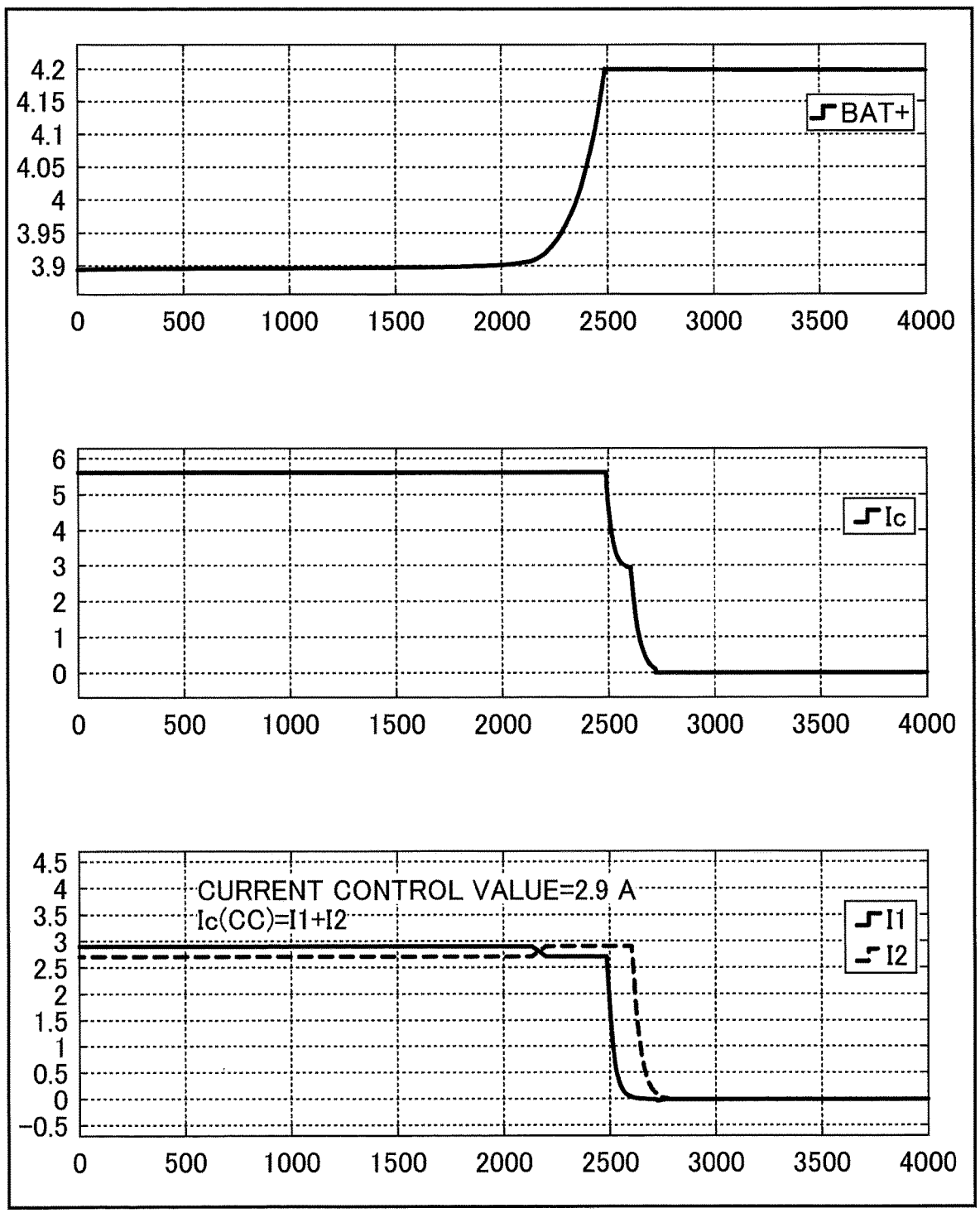
FIG. 3 is a drawing illustrating examples of operating waveforms when the balance control unit according to the first embodiment balances charging currents that flow in charging paths.

FIG. 3 is a drawing illustrating examples of operating waveforms when the balance control unit according to the first embodiment balances the charging currents that flow in the corresponding charging paths. In FIG. 3, a constant charging current Ic (CC) that is supplied from the charger 300 is set to 5.6 A, and the current control value is set to 2.9 A. The horizontal axis indicates "time".

The gate voltage of the transistor 11 is adjusted in such a way that an output voltage of the amplifier 31a does not exceed the reference voltage Vref (i.e., in such a way that the charging current I1 does not exceed the current control value 2.9 A). The relationship "Ic (CC)=I1+I2" holds. Therefore, during a period in which the gate voltage of the transistor 11 is controlled in such a way that the charging current I1 does not exceed the current control value 2.9 A, the charging current I2 is adjusted so as not to exceed 2.7 A. When the cell 201 comes close to a fully-charged state, the charging current I1 starts to decrease, the current values are switched between the charging current I1 and the charging current I2, and an output voltage BAT+ of the secondary battery 200 at the cell connection terminal 3 (refer to FIG. 1) starts to increase. During a period in which the gate voltage of the transistor 21 is controlled (adjusted) in such a way that the charging current I2 does not exceed the current control value 2.9 A, the charging current I2 is controlled (adjusted) not to exceed 2.7 A. When the output voltage BAT+ reaches a predetermined full-charge voltage, the charger 300 stops outputting the charging current Ic (CC).

In this way, according to the first embodiment, it is possible to set the charging currents I1 and I2 at desired current values, respectively (current control values corresponding to the reference voltage Vref).

Figure 4:
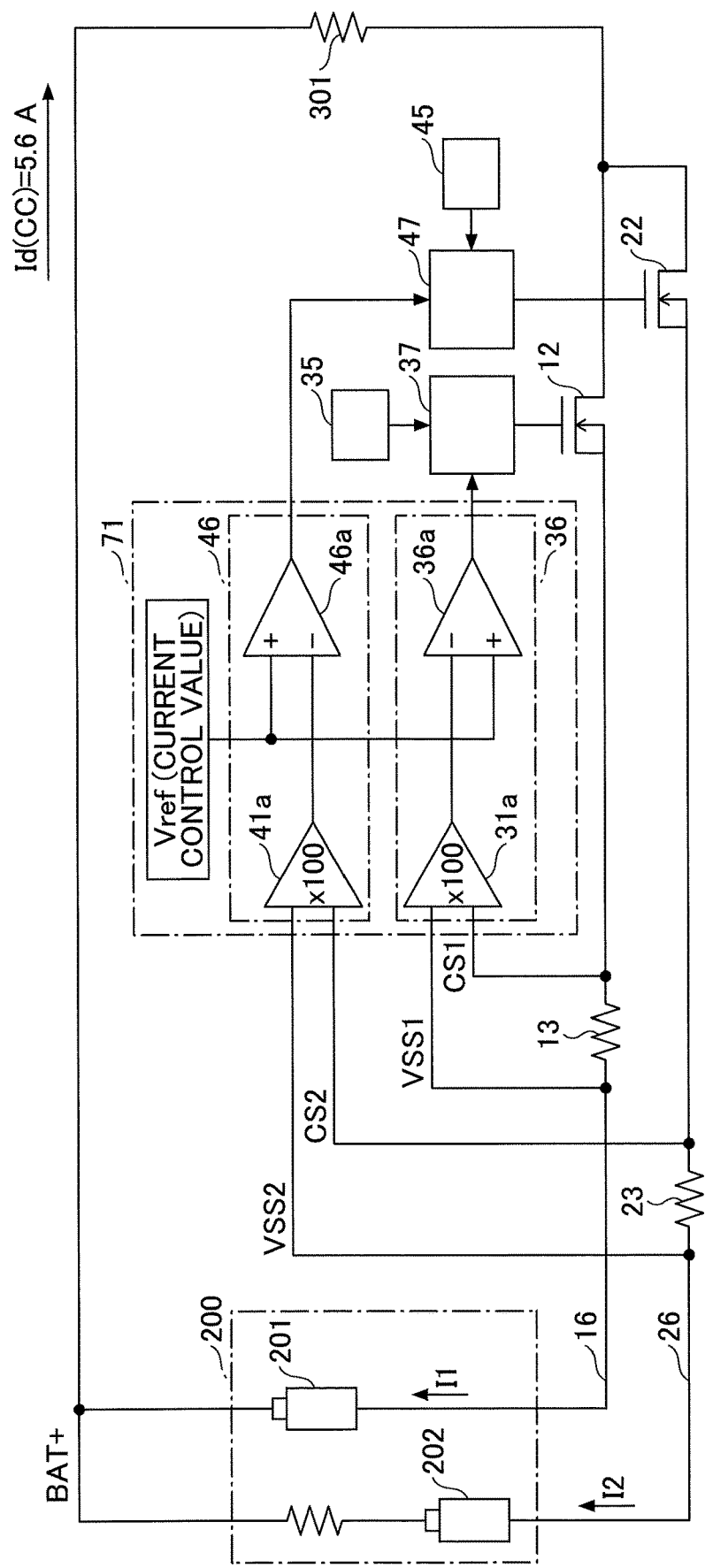
FIG. 4 is a drawing illustrating an example of a structure of a balance control unit according to a first embodiment of the present invention when balancing discharging currents that flow in discharging paths.

FIG. 4 is a drawing illustrating an example of a structure of a balance control unit according to a first embodiment of the present invention when balancing the discharging currents that flow in the corresponding discharging paths. The protection IC 90 according to the first embodiment includes a balance control unit 71. In order to balance the discharging current I1 with the discharging current I2, based on a detection voltage generated by each of the resistors 13 and 23, the balance control unit 71 controls the difference between the discharging current I1 and the discharging current I2 in a saturation region of each of the transistors 12 and 22. The secondary battery 200 is discharged with a constant discharging current Id (CC) (e.g., 5.6 A) output to an external load 301.

The balance control unit 71 operates each of the transistors 12 and 21 in a non-saturation region in a state in which the discharging current I1 and the discharging current I2 are balanced. The balance control unit 71 operates each of the transistors 12 and 21 in a saturation region in a state in which the discharging current I1 and the discharging current I2 are not balanced (a state in which there is a current difference between the discharging current I1 and the discharging current I2).

For example, the balance control unit 71 includes the above-described discharging current control circuit 36 provided for the cell 201 and the above-described discharging current control circuit 46 provided for the cell 202.

The discharging current control circuit 36 controls the difference between the discharging current I1 and the discharging current I2 in a saturation region of the transistor 12 by amplifying a detection voltage generated by the discharging current I1 flowing in the resistor 13 by using an amplifier 31a, and by applying a negative feedback based on the reference voltage Vref. The discharging current control circuit 36 includes, for example, the amplifier 31a and an operational amplifier 33a. For example, in the case where the amplification factor of the amplifier 31a is 100 times, the amplifier 31a outputs a detection voltage that is 100 times the voltage between the two ends of the resistor 13. The discharging current control circuit 36 may use the amplifier 31a in common with the charging current control circuit 33, or may use an amplifier different from the amplifier 31a used by the charging current control circuit 33.

The detection voltage that has been amplified by the amplifier 31a is input to an inverting input node of an operational amplifier 36a, and the reference voltage Vref is input to a non-inverting input node of the operational amplifier 36a. An output voltage of the operational amplifier 36a is a third analog adjustment signal used for adjusting a control voltage value that is input to the transistor 12, and is supplied to the discharging control circuit 37. The discharging control circuit 37 operates the transistor 12 in a saturation region according to the third analog adjustment signal that is supplied from the discharging current control circuit 36.

Similarly, the discharging current control circuit 46 controls the difference between the discharging current I1 and the discharging current I2 in a saturation region of the transistor 22 by amplifying a detection voltage generated by the discharging current I1 flowing in the resistor 23 by using an amplifier 41a, and by applying a negative feedback based on the reference voltage Vref. The discharging current control circuit 46 includes, for example, the amplifier 41a and an operational amplifier 46a. For example, in the case where an amplification factor of the amplifier 41a is 100 times, the amplifier 41a outputs a detection voltage that is 100 times the voltage between the two ends of the resistor 23. The discharging current control circuit 46 may use the amplifier 41a in common with the charging current control circuit 43, or may use an amplifier different from the amplifier used by the charging current control circuit 43.

The detection voltage that has been amplified by the amplifier 41a is input to an inverting input node of an operational amplifier 46a, and the reference voltage Vref is input to a non-inverting input node of the operational amplifier 46a. An output voltage of the operational amplifier 46a is a fourth analog adjustment signal used for adjusting a control voltage value that is input to the transistor 22, and is supplied to the discharging control circuit 47. The discharging control circuit 47 operates the transistor 22 in a saturation region according to the fourth analog adjustment signal that is supplied from the discharging current control circuit 46.

The reference voltage Vref is an example of a predetermined voltage. The reference voltage Vref is a voltage that is set to the same voltage value for each of the discharging current control circuits 36 and 46, and that corresponds to the discharging current values Idth1 and Idth2 (current control values).

In this way, by amplifying a voltage generated at the resistor 13 by the amplifier 31a, and by applying a negative feedback by using the operational amplifier 36a and the transistor 12, the gate voltage of the transistor 12 is adjusted in such a way that an output voltage of the amplifier 31a matches the reference voltage Vref. In other words, it is possible to set the discharging current I1 at a desired current value (current control value corresponding to the reference voltage Vref) according to the reference voltage Vref. Similarly, by amplifying a voltage generated at the resistor 23 by the amplifier 41a, and by applying a negative feedback by using the operational amplifier 46a and the transistor 22, the gate voltage of the transistor 22 is adjusted in such a way that an output voltage of the amplifier 41a matches the reference voltage Vref. In other words, it is possible to set the discharging current I2 at a desired current value (current control value corresponding to the reference voltage Vref) according to the reference voltage Vref.

Figure 5:
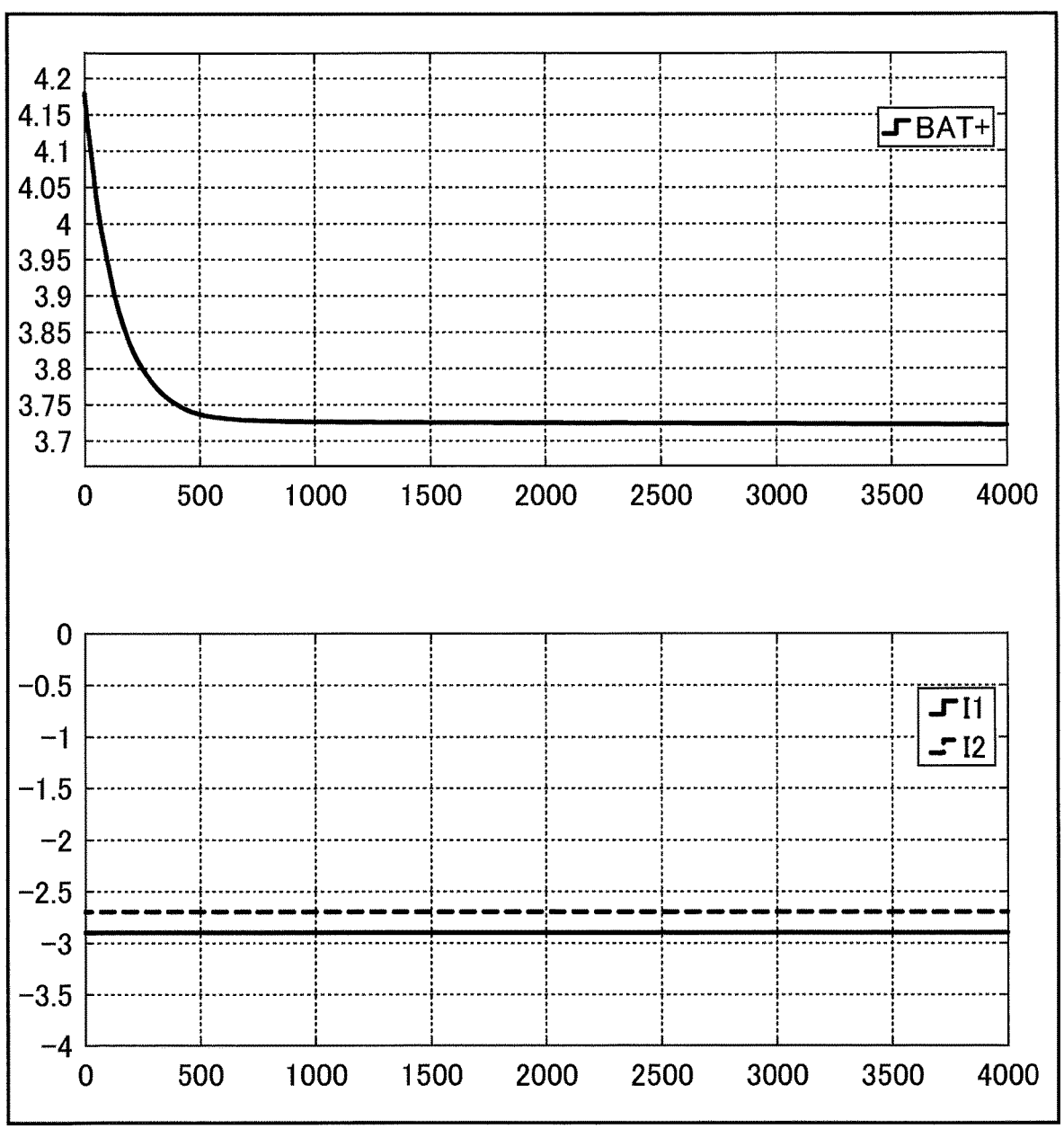
FIG. 5 is a drawing illustrating examples of operating waveforms when the balance control unit according to the first embodiment balances discharging currents that flow in discharging paths.

FIG. 5 is a drawing illustrating examples of operating waveforms when the balance control unit according to the first embodiment balances the discharging currents that flow in the corresponding discharging paths. In FIG. 5, a constant discharging current Id (CC) that is output to an external load 301 is set to 5.6 A, and the current control value is set to 2.9 A. The horizontal axis indicates "time". Similar to the charging case, according to the first embodiment, at the time of discharging, it is possible to set the discharging currents I1 and I2 at desired current values, respectively (current control values corresponding to the reference voltage Vref).

Figure 6:
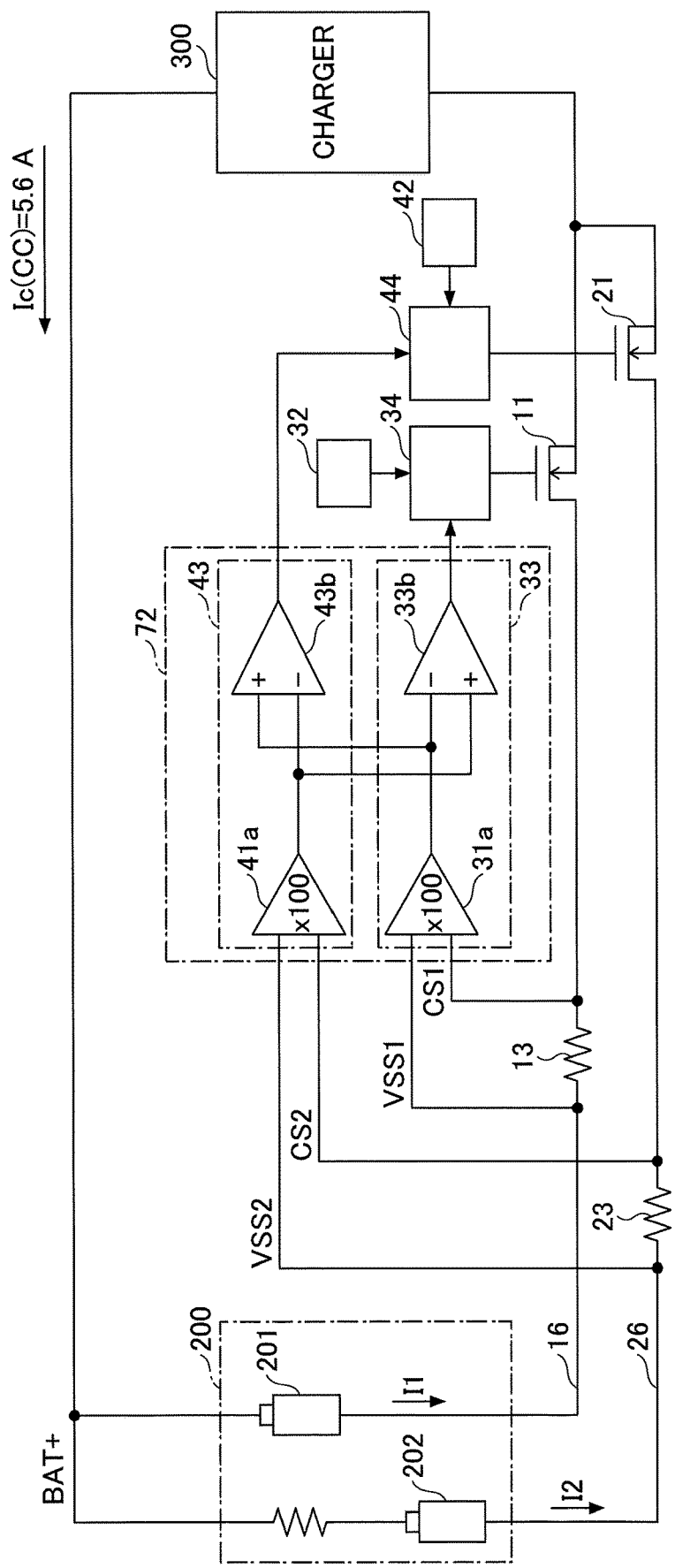
FIG. 6 is a drawing illustrating an example of a structure of a balance control unit according to a second embodiment of the present invention when balancing charging currents that flow in charging paths.

FIG. 6 is a drawing illustrating an example of a structure of a balance control unit according to a second embodiment of the present invention when balancing the charging currents that flow in corresponding charging paths. The protection IC 90 according to the second embodiment includes a balance control unit 72. In order to balance the charge current I1 with the charge current I2, based on a detection voltage generated by each of the resistors 13 and 23, the balance control unit 72 controls the difference between the charging current I1 and the charging current I2 in a saturation region of each of the transistors 11 and 21. The secondary battery 200 is charged with a constant charge current Ic (CC) (e.g., 5.6 A) supplied from a charger 300. Similar to the balance control unit 71, the balance control unit 72 operates each of the transistors 11 and 21 in a non-saturation region or in a saturation region.

For example, the balance control unit 72 includes the above-described charging current control circuit 33 provided for the cell 201 and the above-described charging current control circuit 43 provided for the cell 202.

The charging current control circuit 33 amplifies a detection voltage generated by the charging current I1 flowing in the resistor 13 by using the amplifier 31a, and applies a negative feedback according to a detection voltage amplified by the amplifier 41a in such a way that the charging currents I1 and I2 become the same current value. By applying the negative feedback described above, the charging current control circuit 33 controls the difference between the charging current I1 and the charging current I2 in a saturation region of the transistor 11. On the other hand, the charging current control circuit 43 amplifies a detection voltage generated by the charging current I1 flowing in the resistor 23 by using the amplifier 41a, and applies a negative feedback according to a detection voltage amplified by the amplifier 31a in such a way that the charging currents I1 and I2 become the same current value. By applying the negative feedback described above, the charging current control circuit 43 controls the difference between the charging current I1 and the charging current I2 in a saturation region of the transistor 21.

The charging current control circuit 33 includes, for example, the amplifier 31a and an operational amplifier 33b. For example, in the case where the amplification factor of the amplifier 31a is 100 times, the amplifier 31a outputs a detection voltage that is 100 times the voltage between the two ends of the resistor 13. On the other hand, the charging current control circuit 43 includes, for example, the amplifier 41a and an operational amplifier 43b. For example, in the case where an amplification factor of the amplifier 41a is 100 times, the amplifier 41a outputs a detection voltage that is 100 times the voltage between the two ends of the resistor 23.

The detection voltage that has been amplified by the amplifier 31a is input to an inverting input node of the operational amplifier 33b and a non-inverting input node of the operational amplifier 43b. The detection voltage that has been amplified by the amplifier 41a is input to an inverting input node of the operational amplifier 43b and a non-inverting input node of the operational amplifier 33b.

An output voltage of the operational amplifier 33b is a first analog adjustment signal used for adjusting a control voltage value that is input to the transistor 11, and is supplied to the charging control circuit 34. The charging control circuit 34 operates the transistor 11 in a saturation region according to the first analog adjustment signal that is supplied from the charging current control circuit 33. An output voltage of the operational amplifier 43b is a second analog adjustment signal used for adjusting a control voltage value that is input to the transistor 21, and is supplied to the charging control circuit 44. The charging control circuit 44 operates the transistor 21 in a saturation region according to the second analog adjustment signal that is supplied from the charging current control circuit 43.

By applying the above-described negative feedback, the output voltage of the amplifier 31a and the output voltage of the amplifier 41a become the same. In other words, according to the amplification factors of the amplifiers 31a and 41a, it is possible to set the charge currents I1 and I2 at the desired same current value.

Figure 7:
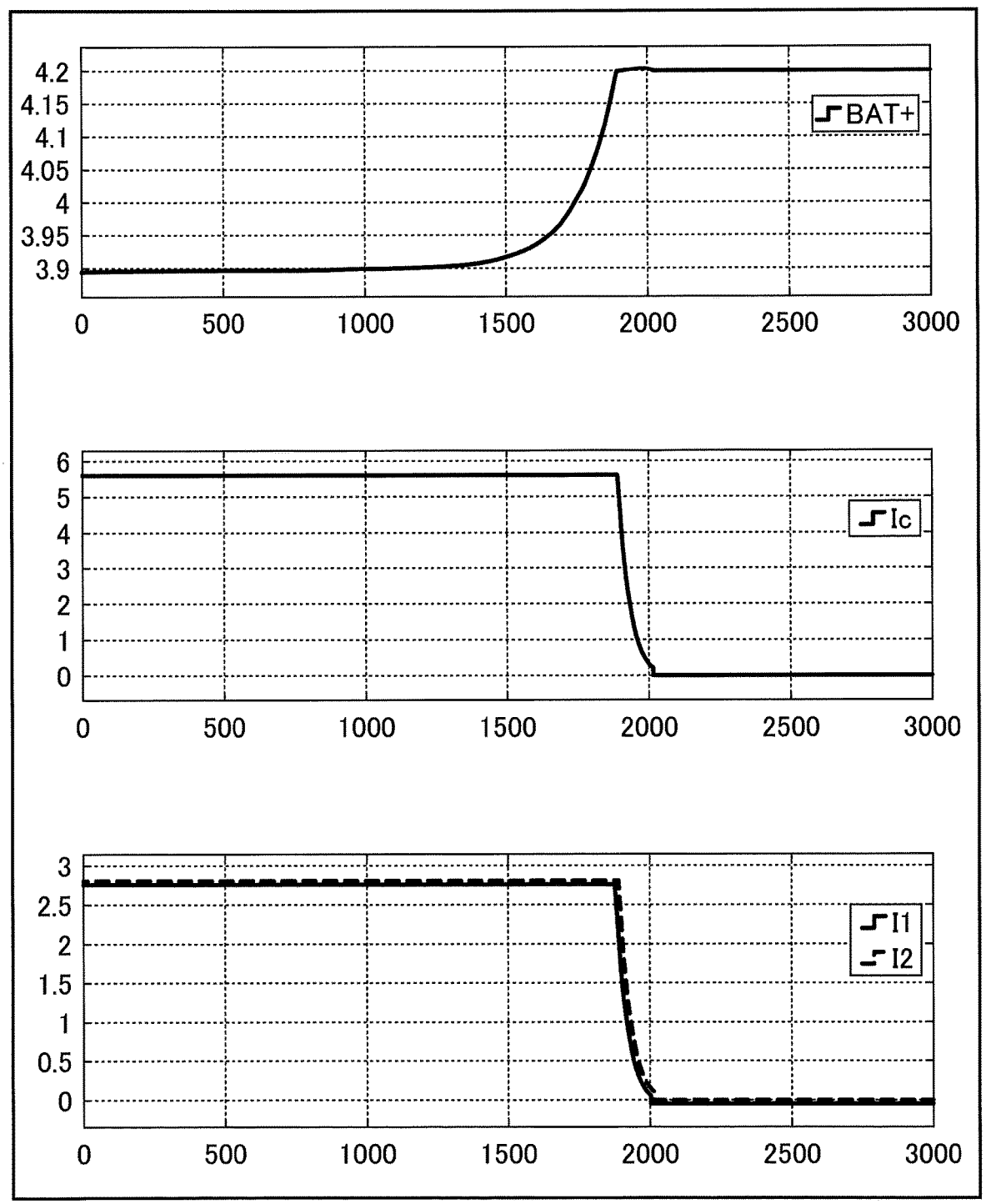
FIG. 7 is a drawing illustrating examples of operating waveforms when the balance control unit according to the second embodiment balances charging currents that flow in charging paths.

FIG. 7 is a drawing illustrating examples of operating waveforms when the balance control unit according to the second embodiment balances the charging currents that flow in the corresponding charging paths. In FIG. 7, a constant charging current Ic (CC) that is supplied from the charger 300 is set to 5.6 A. The horizontal axis indicates "time". As illustrated in FIG. 6, according to the second embodiment, it is possible to set the charging currents I1 and I2 at the same desired current value.

Figure 8:
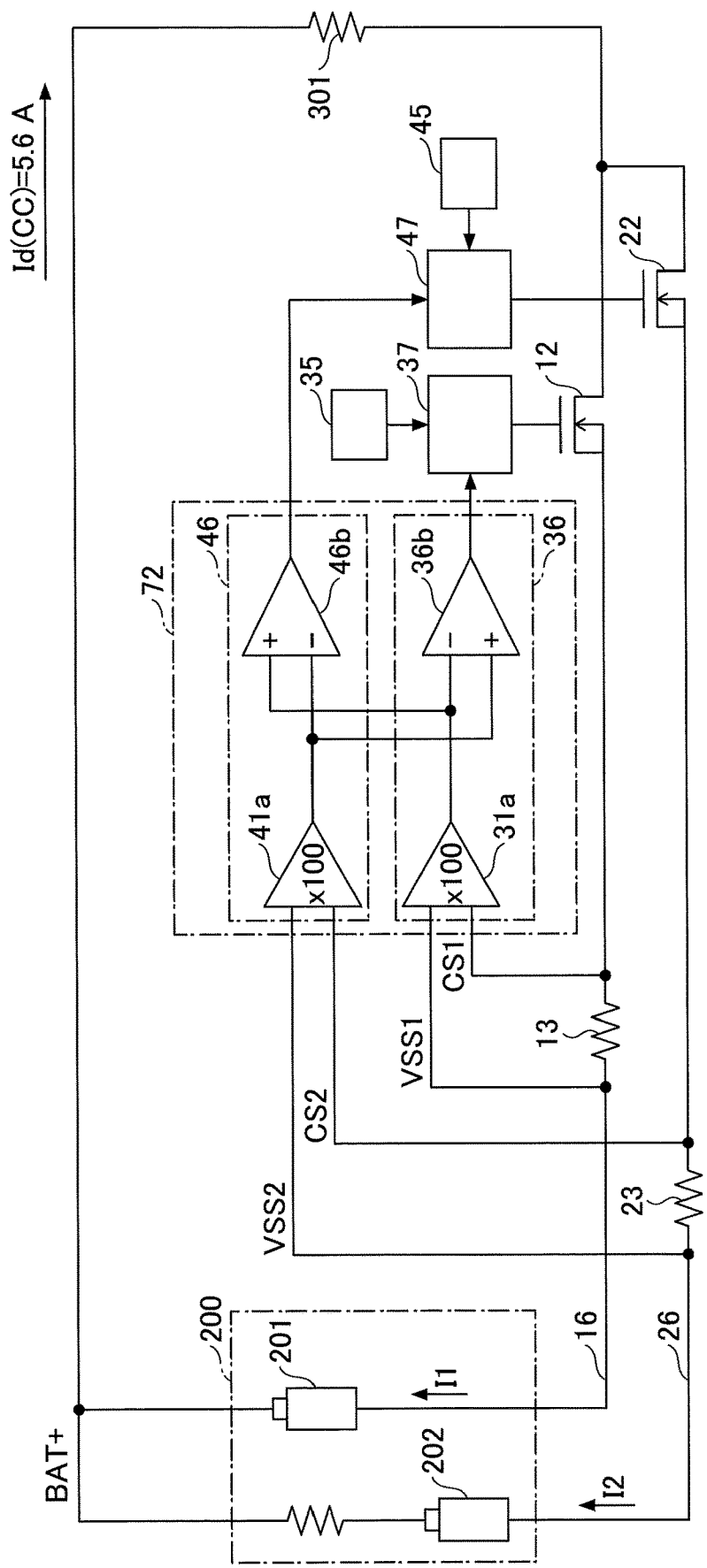
FIG. 8 is a drawing illustrating an example of a structure of a balance control unit according to a second embodiment of the present invention when balancing discharging currents that flow in discharging paths.

FIG. 8 is a drawing illustrating an example of a structure of a balance control unit according to a second embodiment of the present invention when balancing the discharging currents that flow in the corresponding discharging paths. The protection IC 90 according to the second embodiment includes a balance control unit 72. In order to balance the discharging current I1 with the discharging current I2, based on a detection voltage generated by each of the resistors 13 and 23, the balance control unit 72 controls the difference between the discharging current I1 and the discharging current I2 in a saturation region of each of the transistors 12 and 22. The secondary battery 200 is discharged with a constant discharging current Id (CC) (e.g., 5.6 A) output to an external load 301. Similar to the balance control unit 71, the balance control unit 72 operates each of the transistors 12 and 21 in a non-saturation region or in a saturation region.

For example, the balance control unit 72 includes the above-described discharging current control circuit 36 provided for the cell 201 and the above-described discharging current control circuit 46 provided for the cell 202.

The discharging current control circuit 36 amplifies a detection voltage generated by the discharging current I1 flowing in the resistor 13 by using the amplifier 31a, and applies a negative feedback according to a detection voltage amplified by the amplifier 41a in such a way that the discharging currents I1 and I2 become the same current value. By applying the negative feedback described above, the discharging current control circuit 36 controls the difference between the discharging current I1 and the discharging current I2 in a saturation region of the transistor 12. On the other hand, the discharging current control circuit 46 amplifies a detection voltage generated by the discharging current I1 flowing in the resistor 23 by using the amplifier 41a, and applies a negative feedback according to a detection voltage amplified by the amplifier 31a in such a way that the discharging currents I1 and I2 become the same current value. By applying the negative feedback described above, the discharging current control circuit 46 controls the difference between the discharging current I1 and the discharging current I2 in a saturation region of the transistor 22.

The discharging current control circuit 36 includes, for example, the amplifier 31a and an operational amplifier 36b. For example, in the case where the amplification factor of the amplifier 31a is 100 times, the amplifier 31a outputs a detection voltage that is 100 times the voltage between the two ends of the resistor 13. On the other hand, the discharging current control circuit 46 includes, for example, the amplifier 41a and an operational amplifier 46b. For example, in the case where an amplification factor of the amplifier 41a is 100 times, the amplifier 41a outputs a detection voltage that is 100 times the voltage between the two ends of the resistor 23.

The detection voltage that has been amplified by the amplifier 31a is input to an inverting input node of the operational amplifier 36b and a non-inverting input node of the operational amplifier 46b. The detection voltage that has been amplified by the amplifier 41a is input to an inverting input node of the operational amplifier 46b and a non-inverting input node of the operational amplifier 36b.

An output voltage of the operational amplifier 36b is a third analog adjustment signal used for adjusting a control voltage value that is input to the transistor 12, and is supplied to the discharging control circuit 37. The discharging control circuit 37 operates the transistor 12 in a saturation region according to the third analog adjustment signal that is supplied from the discharging current control circuit 36. An output voltage of the operational amplifier 46b is a fourth analog adjustment signal used for adjusting a control voltage value that is input to the transistor 22, and is supplied to the discharging control circuit 47. The discharging control circuit 47 operates the transistor 22 in a saturation region according to the fourth analog adjustment signal that is supplied from the discharging current control circuit 46.

By applying the above-described negative feedback, the output voltage of the amplifier 31a and the output voltage of the amplifier 41a become the same. In other words, according to the amplification factors of the amplifiers 31a and 41a, it is possible to set the discharging currents I1 and I2 at the desired same current value.

Figure 9:
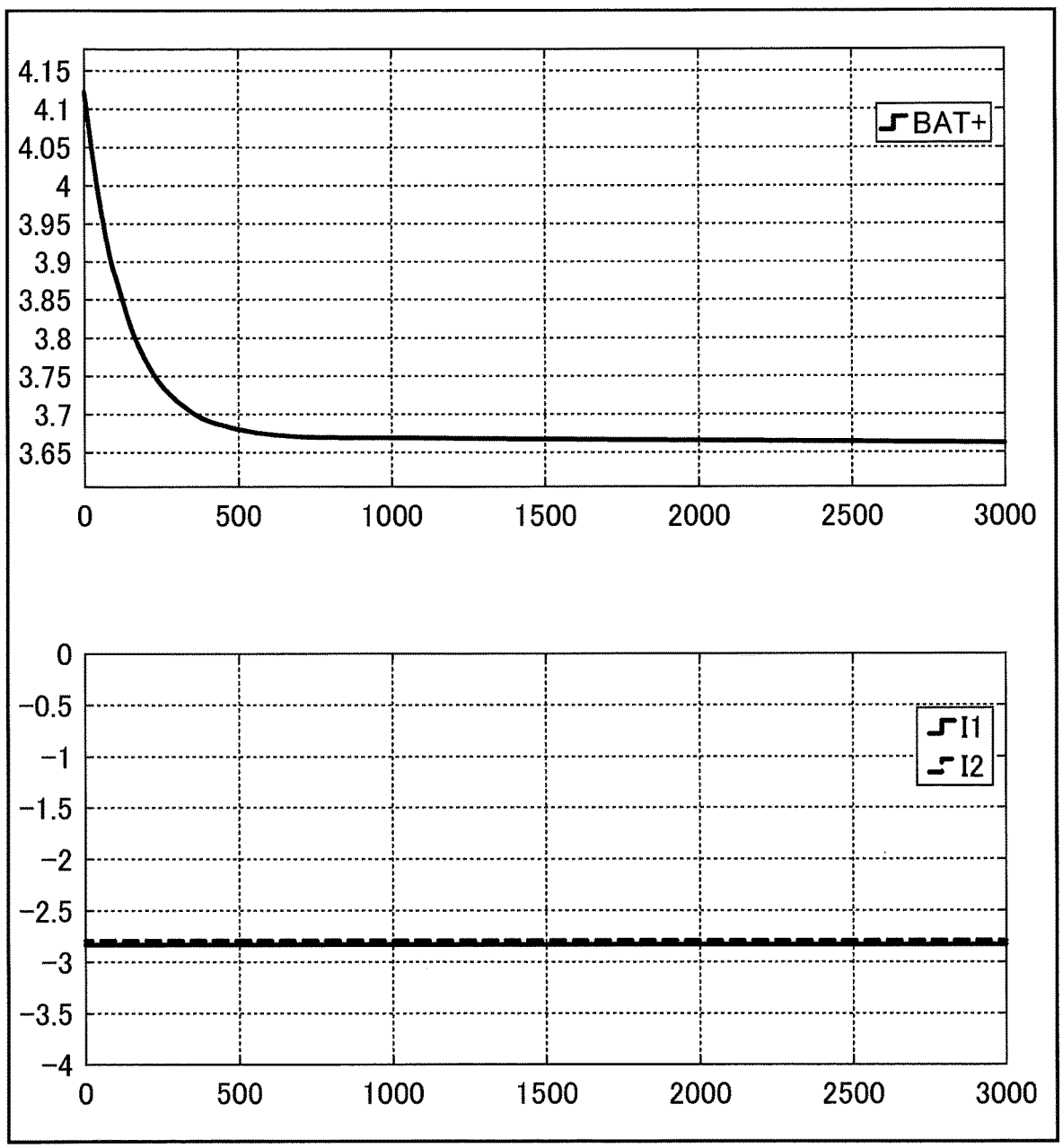
FIG. 9 is a drawing illustrating examples of operating waveforms when the balance control unit according to the second embodiment balances discharging currents that flow in discharging paths.

FIG. 9 is a drawing illustrating examples of operating waveforms when the balance control unit according to the second embodiment balances the discharging currents that flow in the corresponding discharging paths. In FIG. 9, a constant discharging current Id (CC) that is output to an external load is set to 5.6 A. The horizontal axis indicates "time". Similar to the case of charging time, according to the second embodiment, it is possible to set the discharging currents I1 and I2 at the same desired current value at the discharging time.

Figure 10:
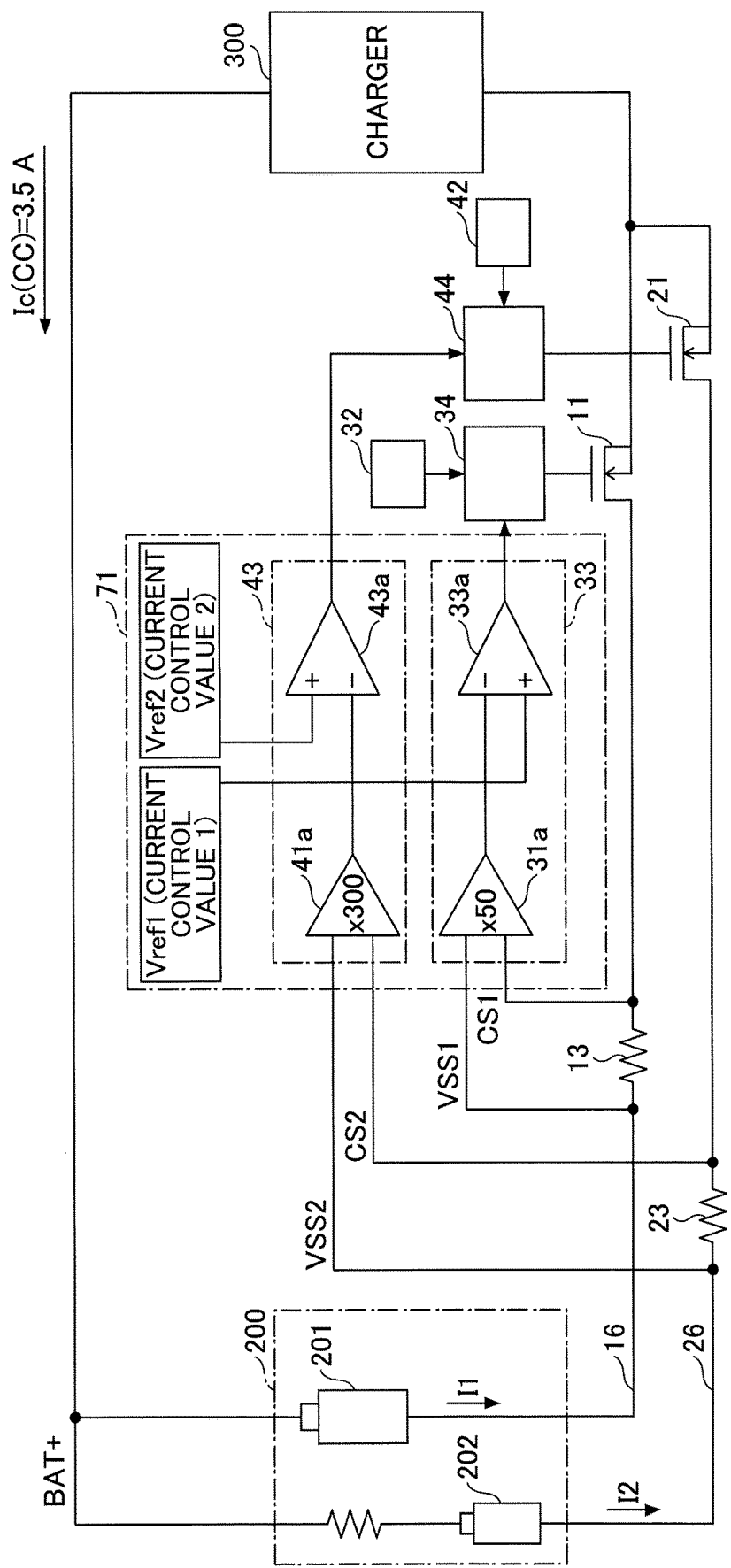
FIG. 10 is a drawing illustrating a modified example of a structure of a balance control unit according to a first embodiment of the present invention when balancing charging currents that flow in charging paths.
Figure 11:
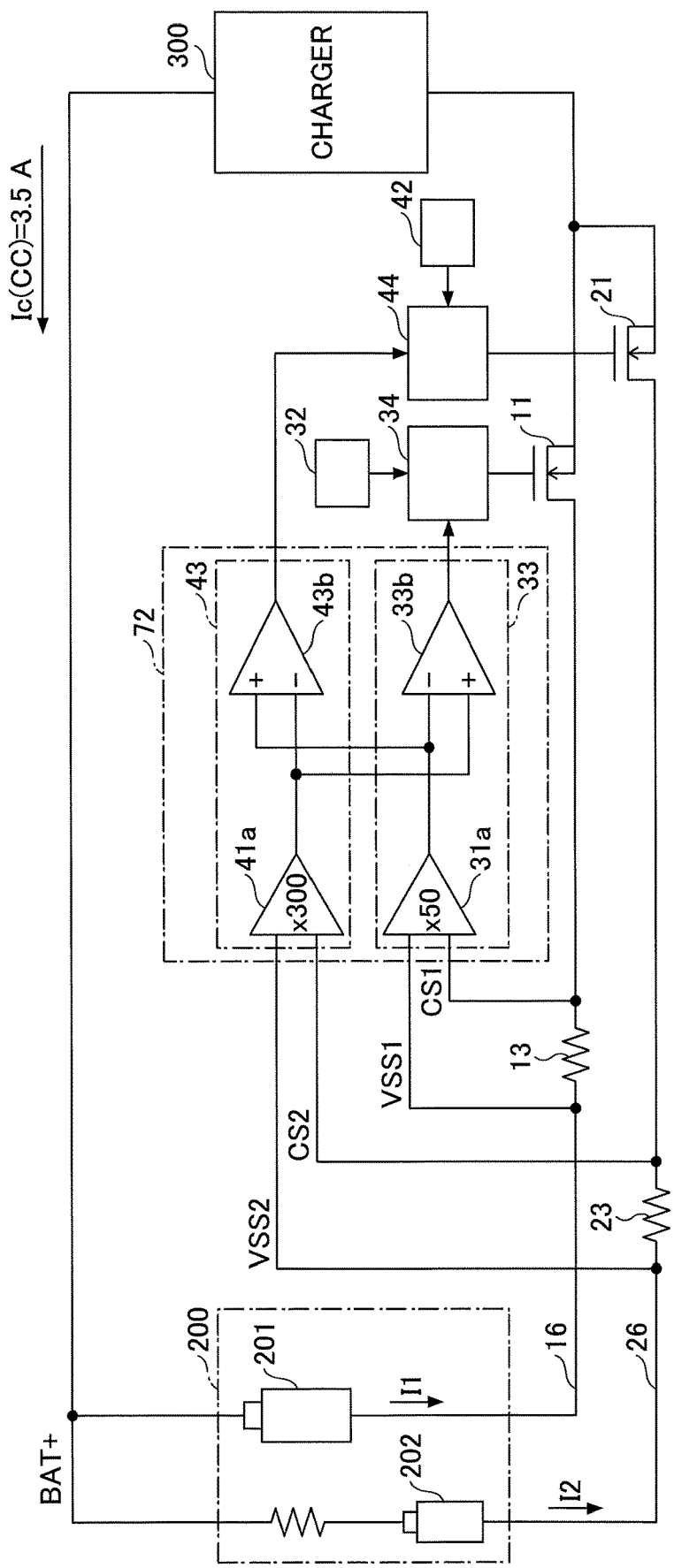
FIG. 11 is a drawing illustrating a modified example of a structure of a balance control unit according to a second embodiment of the present invention when balancing charging currents that flow in charging paths.

FIG. 10 is a drawing illustrating a modified example of a structure of a balance control unit according to a first embodiment of the present invention when balancing the charging currents that flow in corresponding charging paths. FIG. 11 is a drawing illustrating a modified example of a structure of a balance control unit according to a second embodiment of the present invention when balancing the charging currents that flow in corresponding charging paths.

In FIGS. 10 and 11, by setting the amplification factors of the amplifier 31a and the amplifier 41a to different values, it is possible to perform current control for cells with different capacities. For example, in the case where the capacity of the cell 201 is greater than the capacity of the cell 202, the amplification factor of the amplifier 31a corresponding to the cell 201 is set less than the amplification factor of the amplifier 41a corresponding to the cell 202. For example, the amplification factor of the amplifier 31a is set to 50 times, and the amplification factor of the amplifier 41a is set to 300 times.

It should be noted that, in FIG. 10, reference voltages Vref1 and Vref2 are voltages that are set at different voltage values in the charging current control circuits 33 and 43, and are voltages corresponding to the above-described charging current values Icth1 and Icth2 (current control values).

Figure 12:
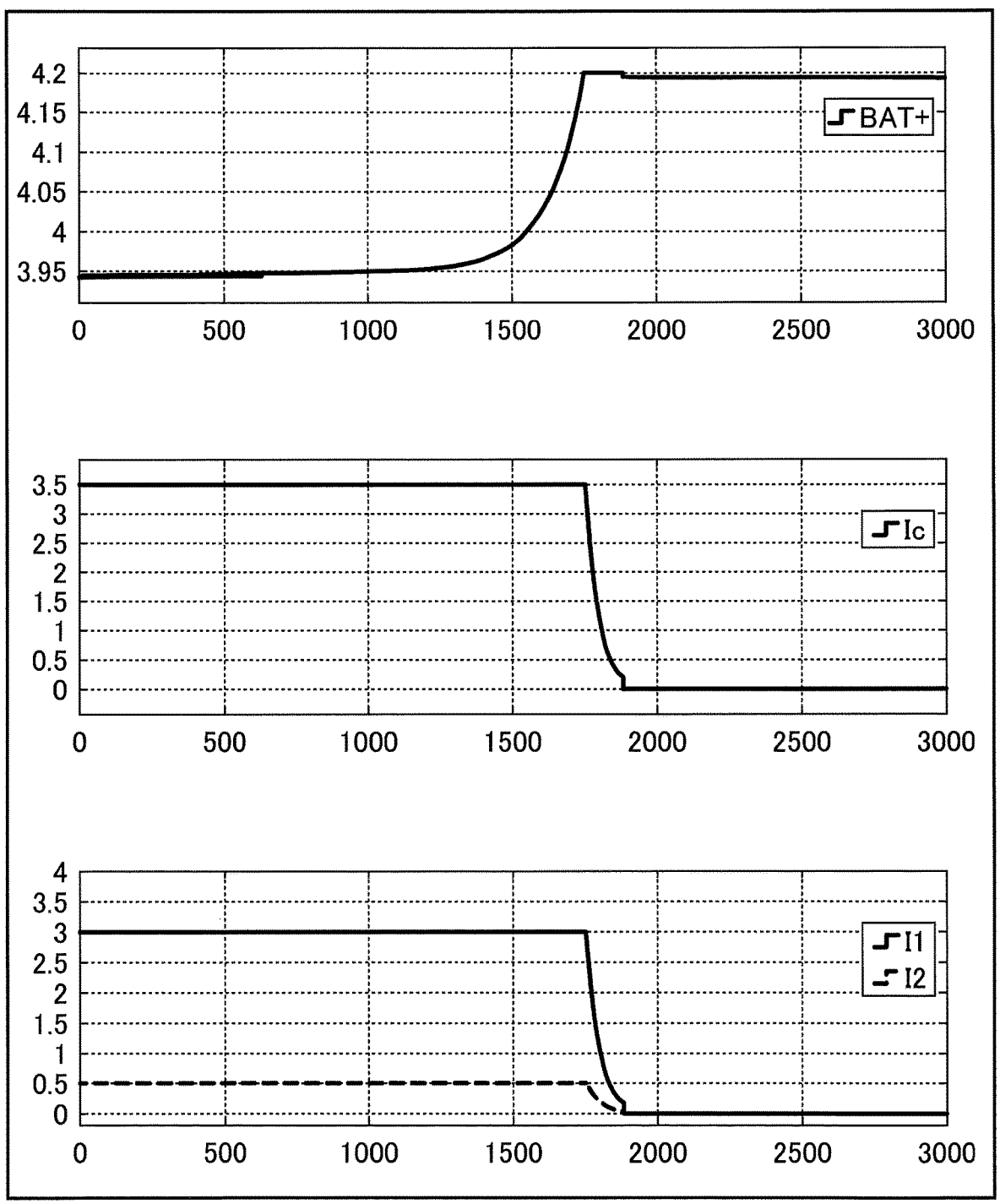
FIG. 12 is a drawing illustrating examples of operating waveforms when the balance control unit according to a modified example of the first and the second embodiments balances charging currents that flow in charging paths.

FIG. 12 is a drawing illustrating examples of operating waveforms when the balance control unit according to a modified example of the first and the second embodiments balances the charging currents that flow in corresponding charging paths. In FIG. 12, a constant charging current Ic (CC) that is supplied from the charger 300 is set to 3.5 A, a current control value for Vref1 is set to 3.0 A, and a current control value for Vref2 is set to 0.5 A. The horizontal axis indicates "time". As illustrated in FIG. 12, according to the modified example of the first and the second embodiments, it is possible to set the charging currents I1 and I2 at desired current values, respectively.

It should be noted that FIGS. 10 to 12 illustrate circuits for controlling the charging currents and operations thereof. Similarly, at the time of discharging, it is possible to set the discharging currents I1 and I2 at desired current values, respectively.

As described above, according to one or more embodiments of the present invention, it is possible to cause a desired current to flow in each of the cells, and, for example, it is possible to cause the currents that flow in the cells to be the same. As a result, it is possible to suppress a deviation of the current that flows in each of the cells, and thus, it is possible to decrease the degradation speed of each of the cells.

As described above, according to one or more embodiments of the present invention, a secondary battery protection circuit, a secondary battery protection integrated circuit, and a battery pack have been described. However, the present invention is not limited to the above embodiments. Various modifications and variations including a combination or a replacement of a part or all of the embodiments may be possible within the scope of the present invention.

For example, the number of cells connected in parallel is not limited to two, and may be three or more.

Further, the charge control transistors and the discharge control transistors are not limited to an N-channel type, and may be a P-channel type. Further, for example, arrangement positions of the charge control transistors and the discharge control transistors may be replaced with each other with respect to the positions illustrated in the figure. Further, the charge control transistors and the discharge control transistors may be implemented in the protection IC.

The present application is based on and claims the benefit of priority of Japanese Priority Application No. 2017-138567 filed on Jul. 14, 2017, the entire contents of which are hereby incorporated herein by reference.

What is claimed is:

1. A secondary battery protection circuit for protecting a secondary battery that has a plurality of cells connected in parallel, the secondary battery protection circuit comprising:
   a charging fault detection unit configured to prohibit charging of the corresponding cell when at least one of overcharging and charging over-current for the corresponding cell is detected, the charging fault detection unit being provided for each of the cells;
   charging control elements each configured to cut off a charging path for the corresponding cell in the case where the charging of the corresponding cell is prohibited by the charging fault detection unit, each of the charging control elements being provided for a corresponding one of the cells, the charging control elements including a first charging control element for a first cell and a second charging control element for a second cell;
   a detection resistor that is inserted in series in the charging path, the detection resistor being provided for each of the cells; and
   a balance control unit configured to, in order to balance a first charging current that flows in a first charging path for the first cell with a second charging current that flows in a second charging path for the second cell, control a difference between the first charging current and the second charging current based on a detection voltage generated by the detection resistor in the first charging path and a detection voltage generated by the detection resistor in the second charging path,
   wherein the balance control unit is further configured to switch between a saturation-region operation and a non-saturation region operation in response to whether the first charging current and the second charging current are balanced, such that both the first charging control element and the second charging control element operate in a non-saturation region in response to occurrence of a state in which the first charging current and the second charging current are balanced, and operate in a saturation region in response to occurrence of a state in which the first charging current and the second charging current are not balanced.

2. The secondary battery protection circuit according to claim 1, wherein
   the balance control unit includes a charging current control unit provided for each of the cells, and
   the charging current control unit for the first cell and the charging current control unit for the second cell control the difference between the first charging current and the second charging current in the saturation region of the first charging control element and the second charging control element by amplifying the detection voltage for the first cell and the detection voltage for the second cell and applying a negative feedback based on a predetermined voltage that is set to the same voltage value in each charging current control unit.

3. The secondary battery protection circuit according to claim 1, wherein
   the balance control unit includes a charging current control unit provided for each of the cells, and
   the charging current control unit for the first cell and the charging current control unit for the second cell control the difference between the first charging current and the second charging current in the saturation region of the first charging control element and the second charging control element by amplifying the detection voltage for the first cell and the detection voltage for the second cell and applying a negative feedback based on a difference between the detection voltage for the first cell and the detection voltage for the second cell in such a way that the first charging current and the second charging current become the same current value.

4. A battery pack comprising: the secondary battery protection circuit according to claim 1; and a secondary battery.

5. A secondary battery protection circuit for protecting a secondary battery that has a plurality of cells connected in parallel, the secondary battery protection circuit comprising:
   a discharging fault detection unit configured to prohibit discharging of the corresponding cell when at least one of over-discharging and discharging over-current for the corresponding cell is detected, the discharging fault detection unit being provided for each of the cells;
   discharging control elements each configured to cut off a discharging path for the corresponding cell in the case where the discharging of the corresponding cell is prohibited by the discharging fault detection unit, each of the discharging control elements being provided for a corresponding one of the cells, the discharging control elements including a first discharging control element for a first cell and a second discharging control element for a second cell;
   a detection resistor that is inserted in series in the discharging path, the detection resistor being provided for each of the cells; and
   a balance control unit configured to, in order to balance a first discharging current that flows in a first discharging path for the first cell with a second discharging current that flows in a second discharging path for the second cell, control a difference between the first discharging current and the second discharging current based on a detection voltage generated by the detection resistor in the first discharging path and a detection voltage generated by the detection resistor in the second discharging path,
wherein the balance control unit is further configured to switch between a saturation-region operation and a non-saturation region operation in response to whether the first discharging current and the second discharging current are balanced, such that both the first discharging control element and the second discharging control element operate in a non-saturation region in response to occurrence of a state in which the first discharging current and the second discharging current are balanced, and operate in a saturation region in response to occurrence of a state in which the first discharging current and the second discharging current are not balanced.

6. The secondary battery protection circuit according to claim 5, wherein
the balance control unit includes a discharging current control unit provided for each of the cells, and
the discharging current control unit for the first cell and the discharging current control unit for the second cell control the difference between the first discharging current and the second discharging current in the saturation region of the first discharging control element and the second discharging control element by amplifying the detection voltage for the first cell and the detection voltage for the second cell and applying a negative feedback based on a predetermined voltage that is set to the same voltage value in each discharging current control unit.

7. The secondary battery protection circuit according to claim 5, wherein
the balance control unit includes a discharging current control unit provided for each of the cells, and
the discharging current control unit for the first cell and the discharging current control unit for the second cell control the difference between the first discharging current and the second discharging current in the saturation region of the first discharging control element and the second discharging control element by amplifying the detection voltage for the first cell and the detection voltage for the second cell and applying a negative feedback based on a difference between the detection voltage for the first cell and the detection voltage for the second cell in such a way that the first discharging current and the second discharging current become the same current value.

8. A battery pack comprising: the secondary battery protection circuit according to claim 5; and a secondary battery.

9. A secondary battery protection integrated circuit for protecting a secondary battery that has a plurality of cells connected in parallel, the secondary battery protection integrated circuit comprising:
a charging fault detection unit configured to prohibit charging of the corresponding cell by operating a charging control element to cut off a charging path for the corresponding cell when at least one of overcharging and charging over-current for the corresponding cell is detected, the charging fault detection unit being provided for each of the cells;
a balance control unit configured to, in order to balance a first charging current that flows in a first charging path for a first cell with a second charging current that flows in a second charging path for a second cell, control a difference between the first charging current and the second charging current based on a detection voltage generated by a detection resistor in the first charging path and a detection voltage generated by a detection resistor in the second charging path,
wherein the balance control unit is further configured to switch between a saturation-region operation and a non-saturation region operation in response to whether the first charging current and the second charging current are balanced, such that both a first charging control element in the first charging path and a second charging control element in the second charging path operate in a non-saturation region in response to occurrence of a state in which the first charging current and the second charging current are balanced, and operate in a saturation region in response to occurrence of a state in which the first charging current and the second charging current are not balanced.

10. A secondary battery protection integrated circuit for protecting a secondary battery that has a plurality of cells connected in parallel, the secondary battery protection integrated circuit comprising:
a discharging fault detection unit configured to prohibit discharging of the corresponding cell by operating a discharging control element to cut off a discharging path for the corresponding cell when at least one of over-discharging and discharging over-current for the corresponding cell is detected, the discharging fault detection unit being provided for each of the cells;
a balance control unit configured to, in order to balance a first discharging current that flows in a first discharging path for a first cell with a second discharging current that flows in a second discharging path for a second cell, control a difference between the first discharging current and the second discharging current based on a detection voltage generated by a detection resistor in the first discharging path and a detection voltage generated by a detection resistor in the second discharging path,
wherein the balance control unit is further configured to switch between a saturation-region operation and a non-saturation region operation in response to whether the first discharging current and the second discharging current are balanced, such that both a first discharging control element and a second discharging control element operate in a non-saturation region in response to occurrence of a state in which the first discharging current and the second discharging current are balanced, and operate in a saturation region in response to occurrence of a state in which the first discharging current and the second discharging current are not balanced.

* * * * *